US010382672B2

(12) United States Patent
Moon et al.

(10) Patent No.: US 10,382,672 B2
(45) Date of Patent: Aug. 13, 2019

(54) IMAGE CAPTURING APPARATUS AND METHOD

(71) Applicant: SAMSUNG ELECTRONICS CO., LTD., Suwon-si, Gyeonggi-do (KR)

(72) Inventors: Kyoung-hwan Moon, Suwon-si (KR); Jin-min Bang, Suwon-si (KR); Tae-wook Nam, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 149 days.

(21) Appl. No.: 15/089,846

(22) Filed: Apr. 4, 2016

(65) Prior Publication Data
US 2017/0019589 A1 Jan. 19, 2017

(30) Foreign Application Priority Data

Jul. 14, 2015 (KR) .................. 10-2015-0099986

(51) Int. Cl.
H04N 5/232 (2006.01)
H04N 5/14 (2006.01)

(52) U.S. Cl.
CPC ......... H04N 5/23222 (2013.01); H04N 5/145 (2013.01); H04N 5/23212 (2013.01); H04N 5/23216 (2013.01)

(58) Field of Classification Search
CPC ........... H04N 5/23212; H04N 5/23293; H04N 5/23219; H04N 5/23222; H04N 1/2145; H04N 5/232; G06K 9/3233; G06K 9/00342; G06K 9/2081
See application file for complete search history.

(56) References Cited

U.S. PATENT DOCUMENTS

| 7,016,518 | B2 | 3/2006 | Vernon |
| 7,835,637 | B2 | 11/2010 | Li et al. |
| 7,854,669 | B2 | 12/2010 | Marty et al. |
| 2003/0189825 | A1* | 10/2003 | Tauch ............... B44C 5/005 362/122 |
| 2007/0021199 | A1 | 1/2007 | Ahdoot |
| 2007/0021207 | A1 | 1/2007 | Ahdoot |
| 2008/0211916 | A1* | 9/2008 | Ono ............... G08B 13/19608 348/164 |
| 2008/0284900 | A1* | 11/2008 | Abe ................. G03B 3/00 348/349 |

(Continued)

FOREIGN PATENT DOCUMENTS

JP 2014-027436 2/2014

Primary Examiner — Roberto Velez
Assistant Examiner — Tuan H Le
(74) Attorney, Agent, or Firm — Nixon & Vanderhye, P.C.

(57) ABSTRACT

An image capturing apparatus and method are provided. The image capturing apparatus includes an image capturing unit including a camera, the image capturing unit configured to capture an image, and a controller connected to the image capturing unit. The controller is configured to set a position of a focus lens at a distance at which an object of the image to be captured is predicted to be positioned, to measure a movement speed of the object of the image to be captured, to determine an image capturing time by predicting a time until the object reaches the set position of the focus lens based on the measured movement speed, and to control the image capturing unit to capture the image of the object at the determined image capturing time.

20 Claims, 29 Drawing Sheets

(56) References Cited

U.S. PATENT DOCUMENTS

| | | | |
|---|---|---|---|
| 2010/0034529 A1* | 2/2010 | Jelinek | G02B 7/36 396/95 |
| 2012/0050587 A1* | 3/2012 | Yamamoto | H04N 5/2258 348/262 |
| 2012/0182462 A1* | 7/2012 | Hamada | H04N 5/23212 348/352 |
| 2012/0229411 A1* | 9/2012 | Arai | G06F 3/0488 345/173 |
| 2013/0076959 A1* | 3/2013 | Yamagata | H04N 5/23212 348/333.01 |
| 2013/0301877 A1* | 11/2013 | Ito | G06T 7/20 382/103 |
| 2014/0028835 A1 | 1/2014 | Sugawara | |
| 2014/0327810 A1* | 11/2014 | Kikuchi | G02B 7/36 348/352 |
| 2015/0371081 A1* | 12/2015 | Luan | G06F 21/32 382/118 |
| 2016/0065832 A1* | 3/2016 | Kim | H04N 5/23212 348/207.11 |
| 2016/0080633 A1* | 3/2016 | Hong | H04N 5/23212 348/169 |
| 2016/0269636 A1* | 9/2016 | Kuchiki | H04N 5/232 |

\* cited by examiner

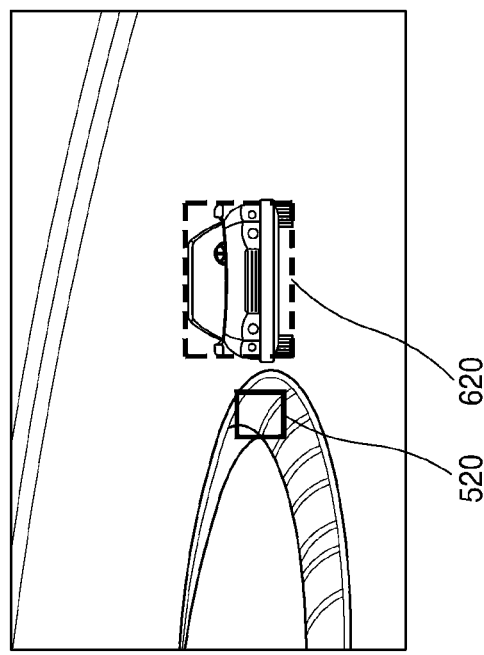
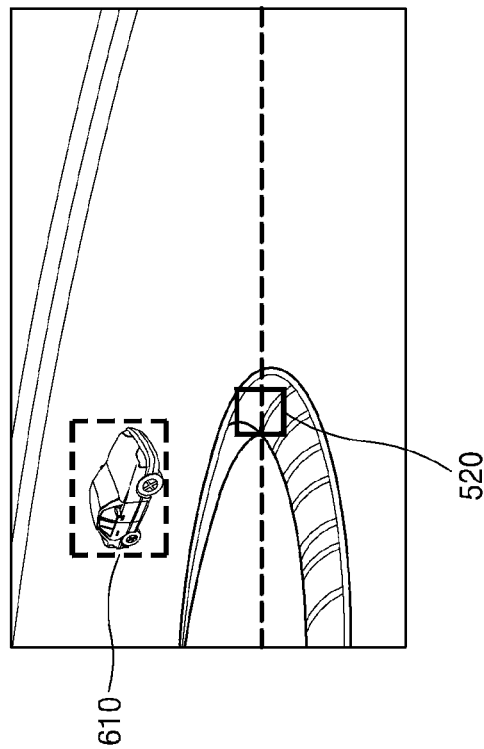
FIG. 6A
FIG. 6B

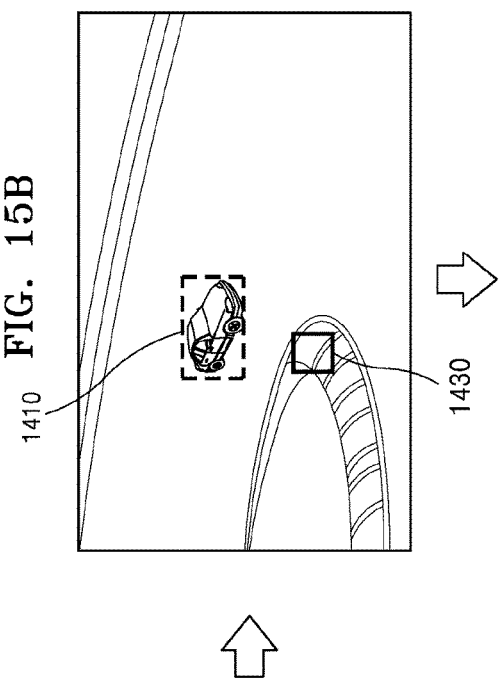
FIG. 15A
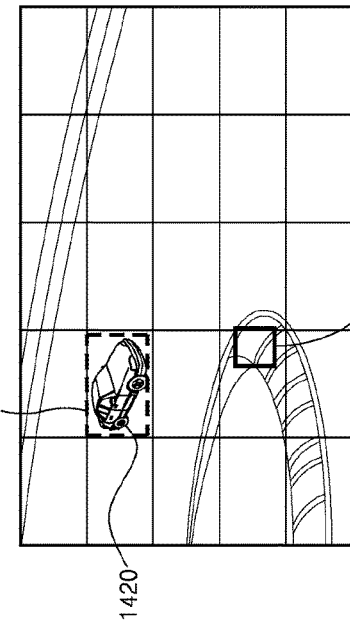
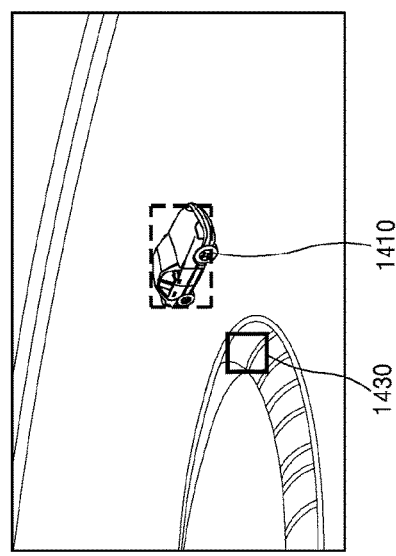
FIG. 15B
FIG. 15C
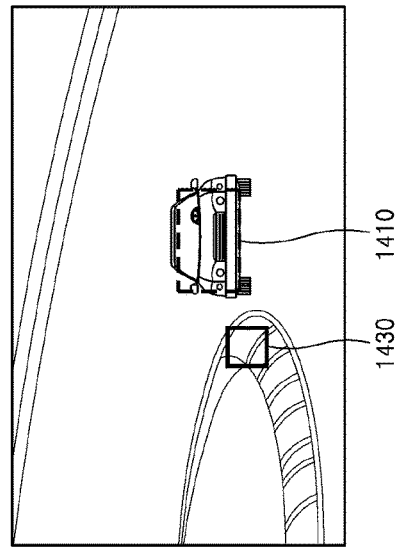
FIG. 15D

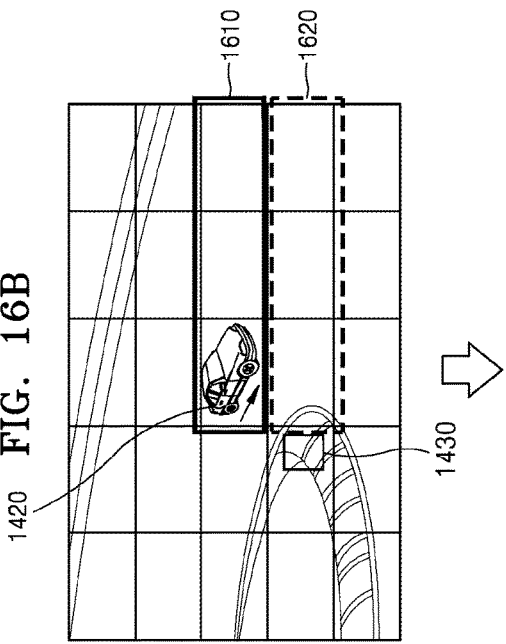
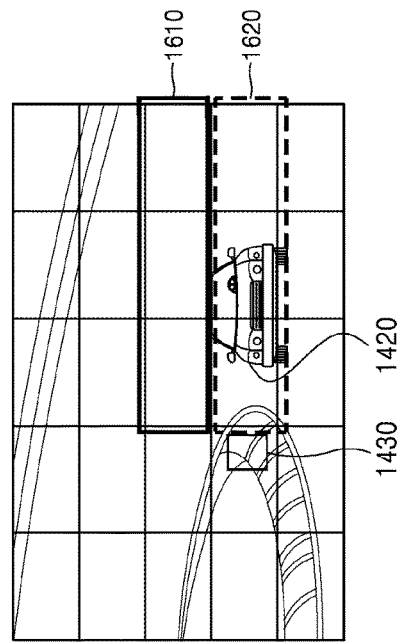
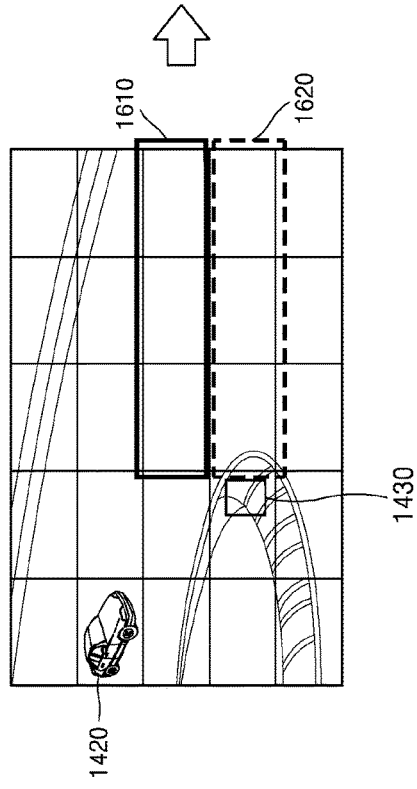

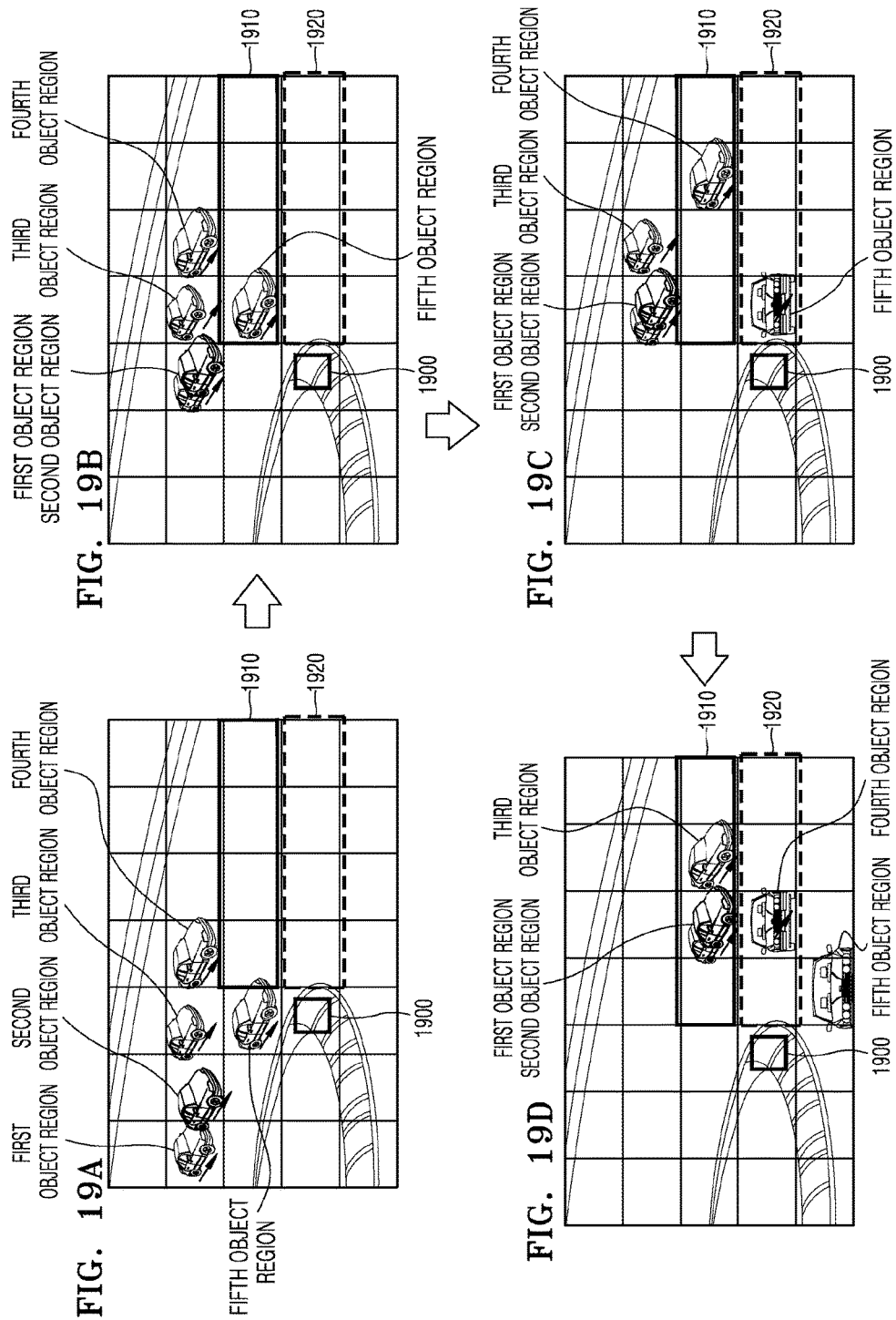

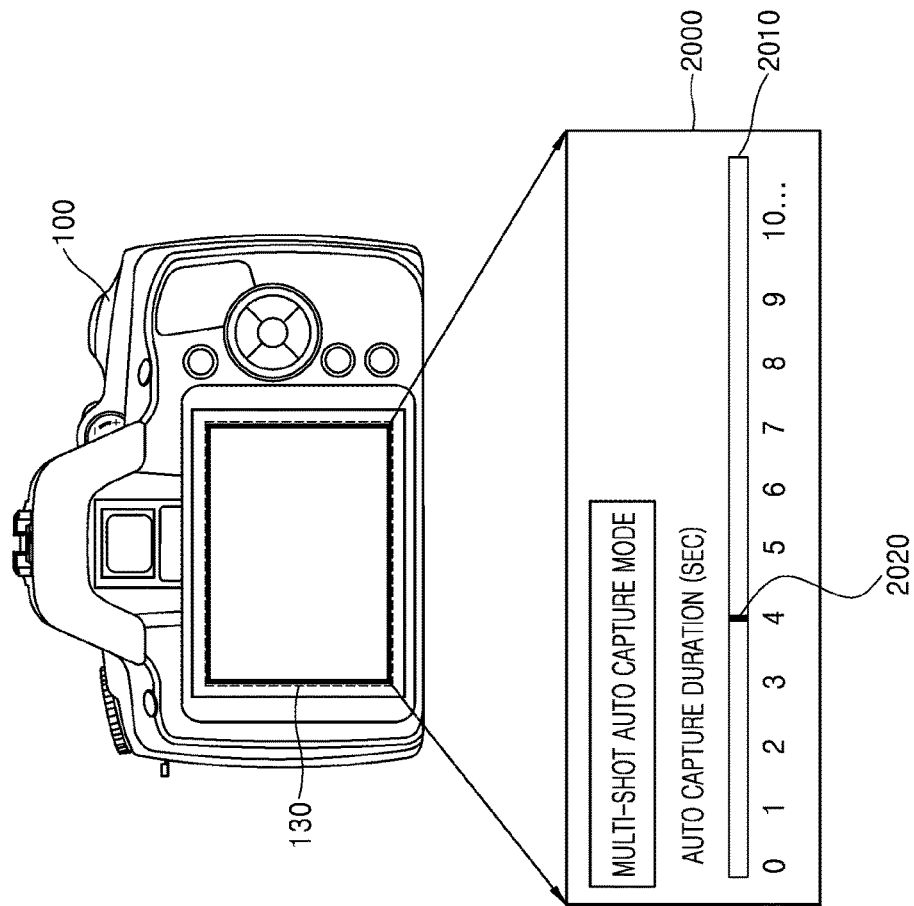

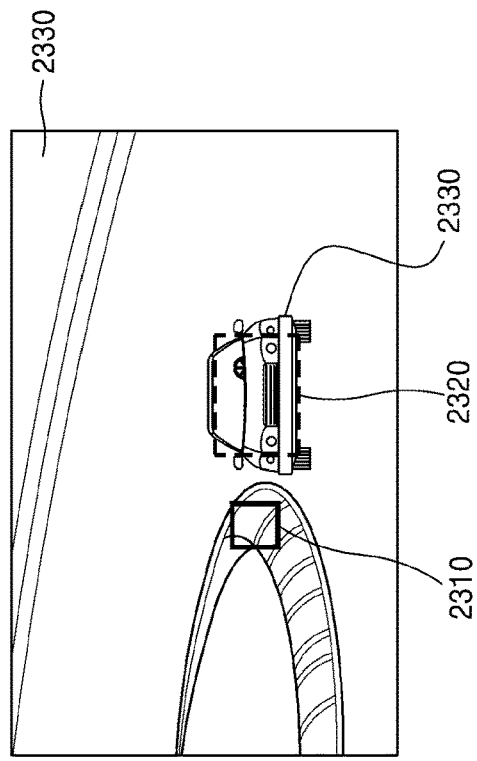
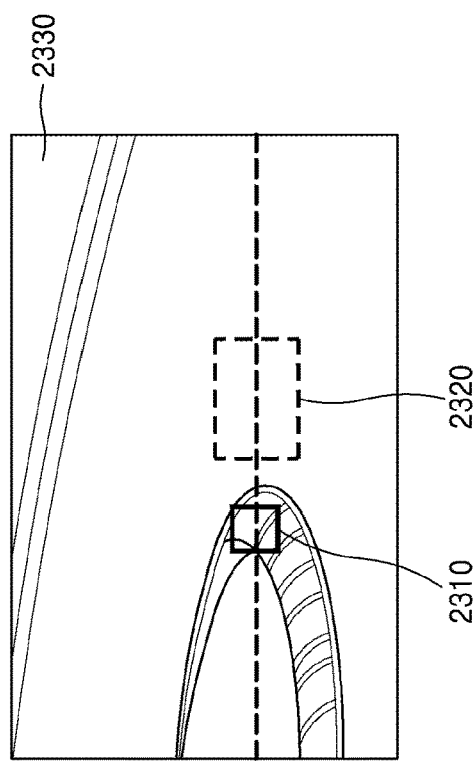

IMAGE CAPTURING APPARATUS AND METHOD

CROSS-REFERENCE TO RELATED APPLICATION

This application is based on and claims priority under 35 U.S.C. § 119 to Korean Patent Application No. 10-2015-0099986, filed on Jul. 14, 2015, in the Korean Intellectual Property Office, the disclosure of which is incorporated by reference herein in its entirety.

BACKGROUND

1. Field

The present disclosure relates to an image capturing apparatus and method.

2. Description of Related Art

Recently, electronic cameras have become widespread. In an electronic camera, an image of an object is formed on a semiconductor imaging element, for example, an image sensor, through an image capturing optical system. The image of the object is converted into an electrical signal and image data of a still image acquired according to the conversion is recorded to a recording medium such as a semiconductor memory or a magnetic disk.

Many electronic cameras are equipped with an autofocus (AF) mechanism for controlling image capturing conditions to automatically focus on the image of the object. In single-lens reflex cameras, phase-difference AF technology is being adopted in a wide range to achieve AF. The phase-difference AF is effective in that an in-focus point may match an image in one driving operation because a distance of the in-focus point from the image may be immediately recognized based on a distance (phase difference) between images when light from the image of the object is received by a phase-difference detection sensor with a charge-coupled device (CCD) line sensor.

On the other hand, a user conventionally captures an image by pressing a shutter button at a proper moment or sets a timer to enable automatic image capturing after a given time. However, it may be difficult to obtain an image desired by the user from captured images because the timing at which the user presses the shutter button may not be correct in the case of an object which moves at a high speed.

SUMMARY

An image capturing apparatus and method for enabling an image of an object to be captured at a focus lens setting position desired by the user are provided.

Additional aspects will be set forth in part in the description which follows and, in part, will be apparent from the description.

According to an example embodiment, an image capturing apparatus includes: an image capturing unit comprising a camera, the image capturing unit configured to capture an image; and a controller connected to the image capturing unit, the controller configured to set a position of a focus lens at a distance at which an object of the image to be captured is predicted to be positioned, to measure a movement speed of the object of the image to be captured, to determine an image capturing time by predicting a time until the object reaches the set position of the focus lens based on the measured movement speed, and to control the image capturing unit to capture the image of the object at the determined image capturing time.

According to an example embodiment, the controller may be configured to determine the image capturing time taking a shutter release lag into account.

According to an example embodiment, the controller may be configured to set the position of the focus lens on another object positioned at the distance at which the object of the image to be captured is predicted to be positioned.

According to an example embodiment, the controller may be configured to set the position of the focus lens based on a touched region by receiving a touch input on another object positioned at the distance at which the object of the image to be captured is predicted to be positioned.

According to an example embodiment, the controller may be configured to set the position of the focus lens by positioning another object positioned at the distance at which the object of the image to be captured is predicted to be positioned in an AF region and receiving a half shutter input.

According to an example embodiment, the controller may be configured to set one or more object regions based on receiving a selection of the one or more object regions displayed on a screen.

According to an example embodiment, the controller may be configured to set an object region based on receiving a selection of a region in which the object is predicted to be shown on a screen.

According to an example embodiment, the controller may be configured to divide a screen into a plurality of sub-regions and to set one or more regions in which movement speeds are detected among the plurality of sub-regions as one or more object regions.

According to an example embodiment, the controller may be configured to divide a screen into a plurality of sub-regions, to measure distances and movement speeds of the sub-regions, and to perform automatic image capturing when a region predicted to be in focus at the set position of the focus lens is detected.

According to an example embodiment, the controller may be configured to provide a user interface, the user interface configured receive an input to set a duration in which images of a plurality of objects are captured in a mode in which the images of the plurality of objects are captured.

According to an example embodiment, a method of capturing an image includes: setting a position of a focus lens at a distance at which an object of an image to be captured is predicted to be positioned; measuring a movement speed of the object of the image to be captured; determining an image capturing time by predicting a time until the object reaches the set position of the focus lens based on the measured movement speed; and capturing the image of the object at the determined image capturing time.

According to an example embodiment, a user may experience various automatic shutter functions by adding a Z-axis auto shot function to the existing X- and Y-axis auto shot functions. In addition, because the auto shot functions are provided, it is possible to eliminate and/or reduce adaptation to a shutter release lag to be learned through experience due to characteristics differing according to each product group for both a person using a camera for the first time and a person familiar with the camera.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIGS. 6A and 6B are diagrams illustrating an example operation of setting an object region;

FIGS. 15A to 15D are diagrams illustrating an example operation of detecting a sub-region including an object, setting the sub-region as an object region, and performing tracking and automatic image capturing;

FIGS. 16A to 16C are diagrams illustrating an example method of automatically detecting an object without setting an object region;

FIGS. 19A to 19D are diagrams illustrating an example process of detecting a plurality of objects without setting an object region to capture an image;

FIGS. 20A and 20B are diagrams illustrating an example of a user interface to set a duration of an operation mode in which the image capturing apparatus 100 automatically captures images of a plurality of objects using a continuous shooting function;

FIGS. 23A and 23B are diagrams illustrating an example operation in the Z-axis trap shot mode when an image of a car race is captured.

DETAILED DESCRIPTION

Figure 1A:
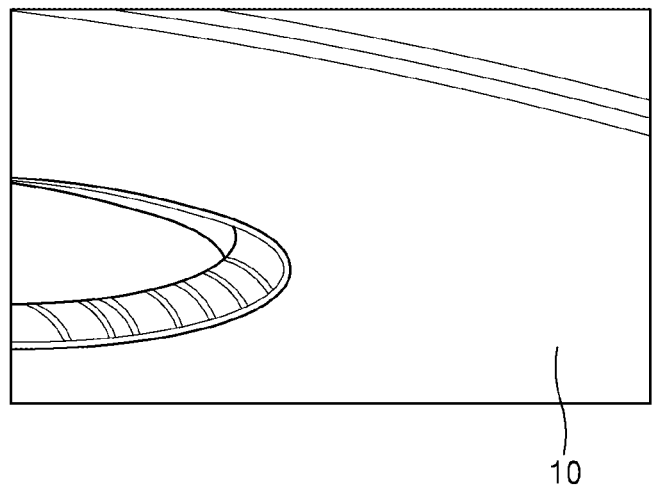
FIGS. 1A to 1E are diagrams illustrating example concepts of various example embodiments.

Reference will now be made in greater detail to example embodiments, examples of which are illustrated in the accompanying drawings, wherein like reference numerals refer to like elements throughout. In this regard, the example embodiments may have different forms and are not to be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terms used in the present disclosure will be briefly described, and the present disclosure will be described in greater detail below.

Although general terms widely used at present were selected in view of the functions in the example embodiments, these general terms may vary according to intentions of one of ordinary skill in the art, case precedents, the advent of new technologies, and the like. Terms may be arbitrarily selected and may also be used in specific cases. In such cases, their meanings may be given in the detailed description. Hence, the terms may be defined based on their meanings and the content of the entire description, not necessarily by simply stating the terms.

It will be understood that the terms "comprises" and/or "comprising" or "includes" and/or "including" when used in this description, specify the presence of stated elements, but do not preclude the presence or addition of one or more other elements. Terms such as "unit" and "module" stated in the description may refer to units that process at least one function or operation, and they may be implemented using hardware, firmware software, or a combination of hardware and software.

Hereinafter, example embodiments of the present disclosure will be described in greater detail with reference to the accompanying drawings so that those skilled in the art may readily understand the example embodiments. However, the present disclosure may be implemented in various different forms and is not limited to the example embodiments set forth herein. In order to clearly describe the present disclosure, the descriptions of functions and elements which are not directly related to the present disclosure may be omitted. Like reference numerals denote like elements throughout the accompanying drawings.

FIGS. 1A to 1E are diagrams illustrating example concepts of various exemplary embodiments.

Methods of capturing an image of a moving object at an optimum or substantially optimum timing are provided.

Figure 1B:
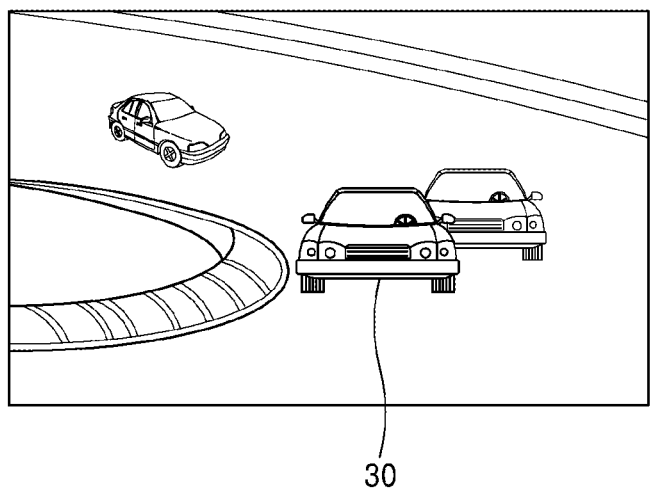

In FIG. 1A, a car track 10 is illustrated. A photographer may be positioned at a front position of the track and may desire to capture an image of a car that travels from a rear position of the track to the front position of the track. For example, the photographer may desire to capture an image of an object when the object is positioned at a distance close to the photographer after moving from a distance far away from the photographer. For this, the photographer may capture an image by pressing a shutter of the camera at a point in time at which the image of the car is desired to be captured when the car gradually approaches the photographer from the rear position of the track. However, because of a structural characteristic of the camera itself, there is a shutter lag between a point in time at which the photographer presses the shutter of the camera and a point in time at which an image is acquired by the camera. Accordingly, when the shutter of the camera is pressed in a state in which the car 30 is positioned as illustrated in FIG. 1B based on the naked eye of the photographer, it may be difficult for the photographer to obtain a desired image of the car 30 because the camera actually obtains an image in a state in which the car 30 is already significantly advanced. This is especially the case when the subject to be photographed is moving at a high rate of speed.

Figure 1C:
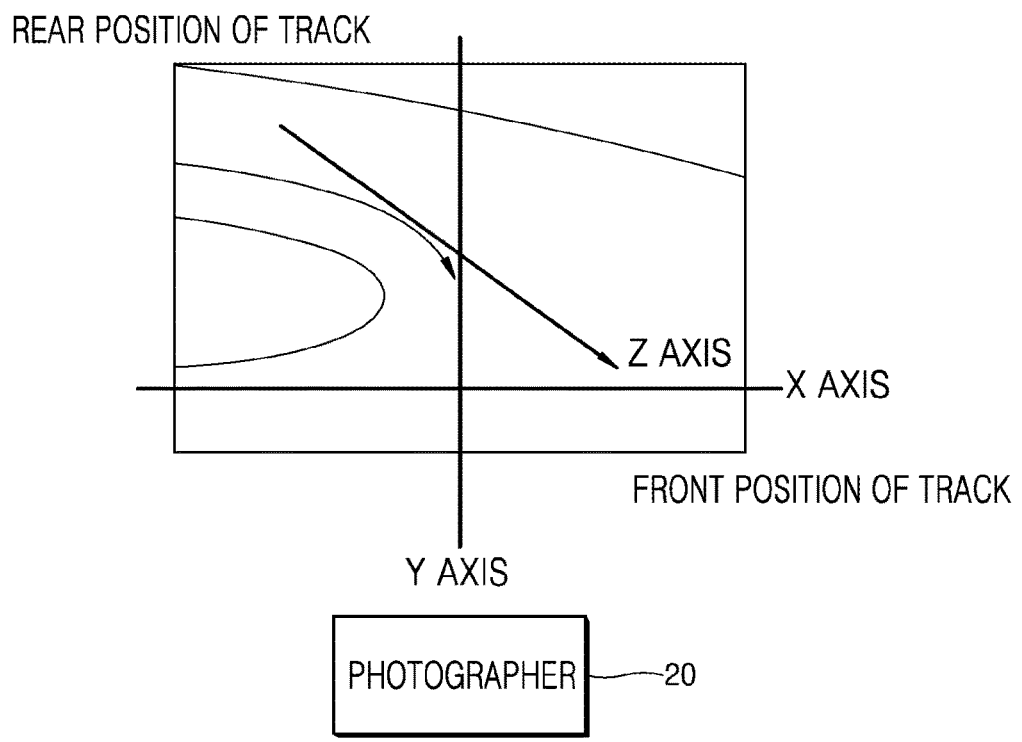

With reference to FIG. 1C, concepts of various example embodiments will be described.

With reference to FIG. 1C, the photographer 20 is positioned at a front position of the car track. An object of an image to be captured may move from the rear position of the track to the front position of the track at which the photographer is positioned. When the photographer positioned at the front position of the track captures an image of the track, an image having a composition as illustrated in FIG. 1C may be captured. In the image illustrated in FIG. 1C, a distance on an X axis represents a distance on the width of the track, a distance on a Y axis represents a height from the ground, and a distance on a Z axis represents a distance between the object of the image to be captured and the photographer. To acquire the timing at which the photographer desires to capture the image, it may be necessary to perform an operation so that the timing desired by the photographer, for example, the timing at which the moving object reaches a position at which the photographer desires to capture the image, is predicted in advance and the camera captures the image at the predicted timing.

According to an example embodiment, the photographer may set a position on the Z axis at which he or she desires to capture the image of the moving object and the camera may measure a movement speed of the moving object, predict a necessary time until the object reaches the set position on the Z axis, and determine an image capturing time based on the predicted time.

Figure 1D:
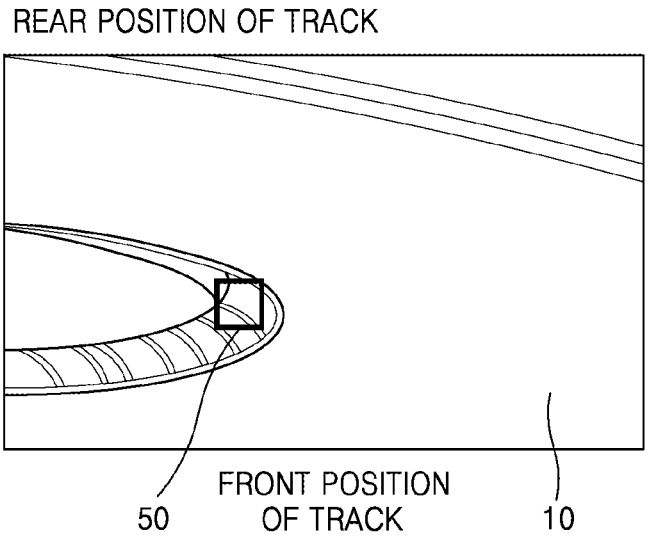
Figure 1E:
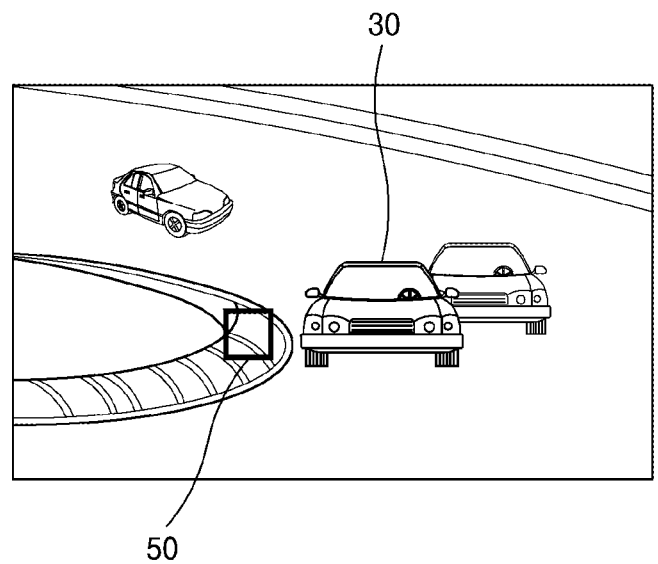

Referring to FIG. 1D, the camera may set a position 50 at which the object is desired to be captured on the Z axis within the image. The camera may capture an image of the car 30 which is an object at the position 50 desired by the photographer as illustrated in FIG. 1E by measuring the movement speed of the object, predicting a necessary time until the object reaches the position 50 on the Z axis, determining an image capturing time based on the predicted time, and capturing an image at the determined time.

Figure 2:
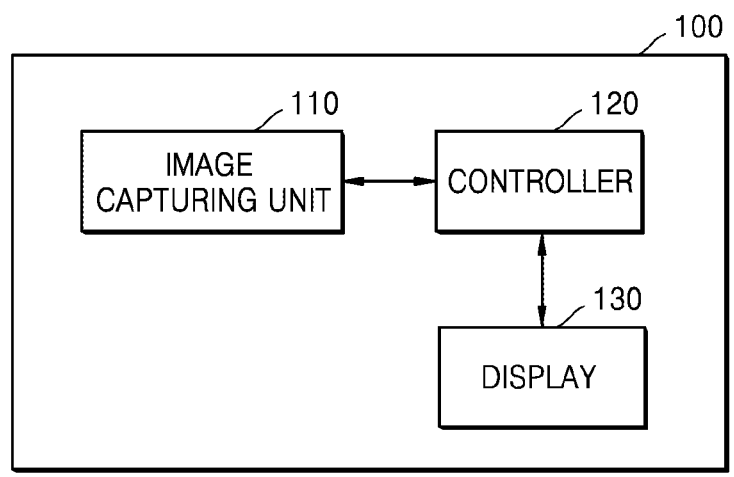
FIG. 2 is a block diagram illustrating an example image capturing apparatus 100.

FIG. 2 is a block diagram illustrating an example image capturing apparatus 100.

The image capturing apparatus may be implemented in various types such as a digital still camera for capturing a still image or a digital video camera for capturing a video. In addition, the image capturing apparatus may include a digital single-lens reflex camera (DSLR), a mirrorless camera, or a smartphone, or the like, but is not limited thereto. The image capturing apparatus may include an apparatus including a lens and an imaging element and equipped with a camera module capable of capturing an image of an object to generate the image.

Referring to FIG. 2, the image capturing apparatus 100 may include an image capturing unit (e.g., including a camera) 110, a controller (e.g., including processing circuitry, such as, for example, a CPU) 120, and a display (e.g. including a display panel) 130.

The image capturing unit 110 may include at least one camera and may include an infrared (IR) camera. In addition, when an optical system moves, the image capturing unit 110 may move with the optical system in the same direction.

The display 130 may display at least one object. The display 130 may display a viewfinder image so that a composition of an object of an image to be captured and an image capturing condition may be identified.

In addition, the display 130 may, for example, be configured as a liquid crystal display (LCD), an organic light-emitting display panel, or the like.

According to an example embodiment, the display 130 may be implemented as a touch-sensitive display.

According to an example embodiment, the display 130 may provide a user interface so that a position of the focus lens may be set.

According to an example embodiment, the display 130 may provide a user interface so that a region of an object may be set.

According to an example embodiment, the display 130 may provide a user interface so that an image capturing duration may be set when images of a plurality of objects are continuously captured.

The controller 120 may be configured to control components of the image capturing apparatus 100 such as the image capturing unit 110 and the display 130.

According to an example embodiment, the controller 120 may be configured to set a position of a focus lens at a distance at which an object of the image to be captured is predicted to be positioned, to measure a movement speed of the object of the image to be captured, to determine an image capturing time by predicting a time until the object reaches the set position of the focus lens based on the measured movement speed, and to control the image capturing unit 110 to capture the image of the object at the determined image capturing time.

According to an example embodiment, the controller 120 may be configured to determine the image capturing time taking a shutter release lag into account.

According to an example embodiment, the controller 120 may be configured to set the position of the focus lens on another object positioned at the distance at which the object of the image to be captured is predicted to be positioned.

According to an example embodiment, the controller 120 may be configured to set the position of the focus lens based on a received touch input on another object positioned at the distance at which the object of the image to be captured is predicted to be positioned.

According to an example embodiment, the controller 120 may be configured to set the position of the focus lens by positioning another object positioned at the distance at which the object of the image to be captured is predicted to be positioned in an AF region and receiving a half shutter input.

According to an example embodiment, the controller 120 may further be configured to set a region of the object of the image to be captured and to set one or more object regions by receiving a selection on the one or more object regions displayed on a screen.

According to an example embodiment, the controller 120 may further be configured to set a region of the object of the image to be captured and to set an object region by receiving the selection on a region in which the object is predicted to be shown on a screen.

According to an example embodiment, the controller 120 may further be configured to set a region of the object of the image to be captured, to divide a screen into a plurality of sub-regions, and to set one or more regions in which movement speeds are detected among the plurality of sub-regions as one or more object regions.

According to an example embodiment, the controller 120 may be configured to divide a screen into a plurality of sub-regions, to measure distances and movement speeds of the sub-regions, and to perform automatic image capturing when a region predicted to be in focus at the set position of the focus lens is detected.

According to an example embodiment, the controller 120 may be configured to provide a user interface configured to receive an input to set a duration in which images of a plurality of objects are captured in a mode in which the images of the plurality of objects are captured.

Figure 3A:
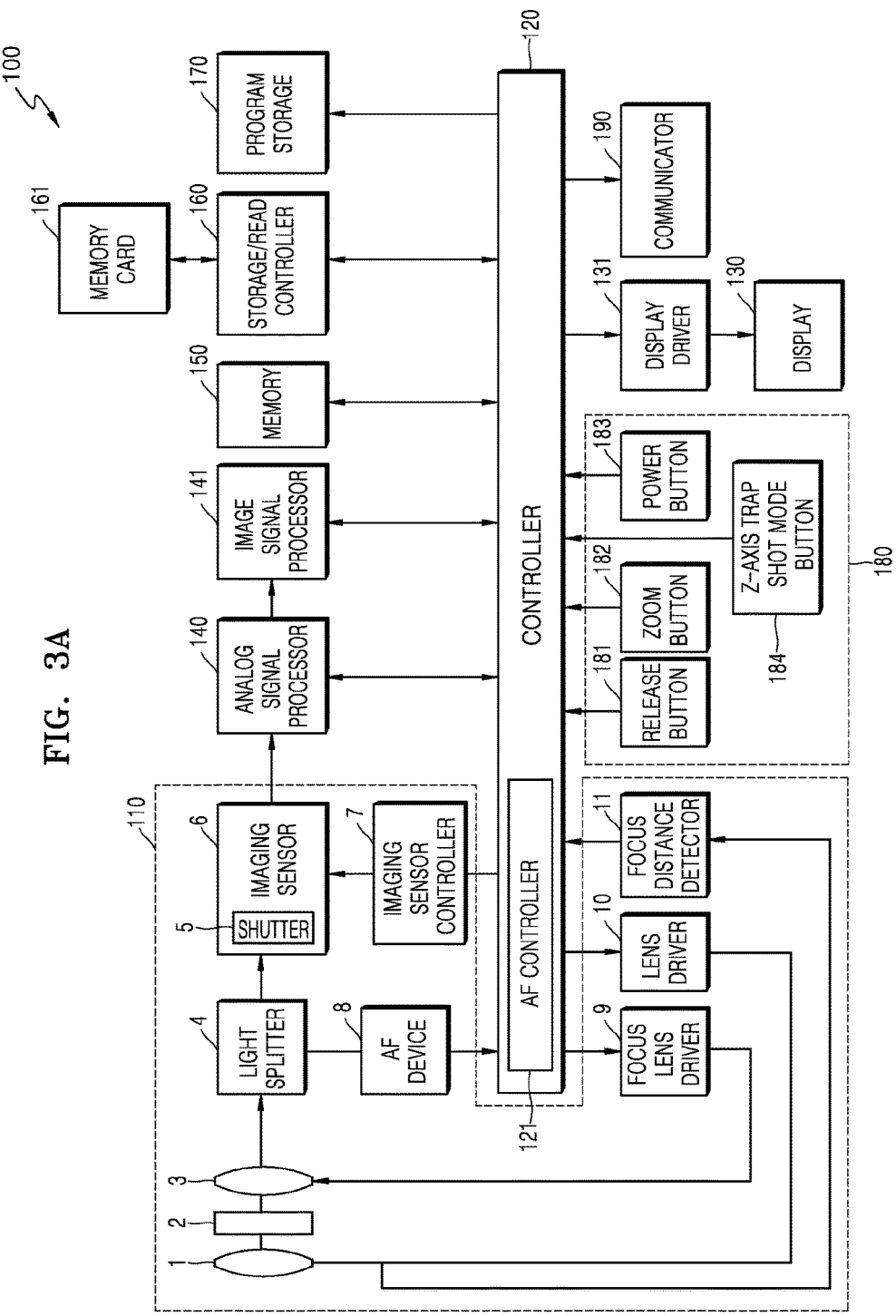
FIG. 3A is a block diagram illustrating an example configuration of an image capturing apparatus.

FIG. 3A is a block diagram illustrating an example configuration of an image capturing apparatus.

Referring to FIG. 3A, the image capturing apparatus 100 includes an image capturing unit 110, a controller (e.g., including processing circuitry) 120, a display 130, a display driver 131, an analog signal processor 140, an image signal processor 141, a memory 150, a storage/read controller 160, a memory card 161, a program storage 170, a manipulator or an input 180, and a communicator (e.g., including communication circuitry) 190.

The image capturing unit 110 includes, for example, an image capturing lens 1, a diaphragm 2, a focus lens 3, a light splitter 4, a shutter 5, an imaging sensor 6, an imaging sensor controller 7, an AF device 8, a focus lens driver 9, a lens driver 10, and a focus distance detector 11 as components for generating an image of an electric signal from incident light.

The image capturing lens 1 may include, for example, a plurality of lens groups or a plurality of lenses for capturing an image of an object. The position of the lens 1 may be adjusted by the lens driver 10. The lens driver 10 may adjust the position of the lens 1 based on a control signal provided from the controller 120.

A degree of opening/closing of the diaphragm 2 may be adjusted by the diaphragm driver (not illustrated) and the diaphragm 2 adjusts an intensity of light incident on the imaging sensor 6.

The position of the focus lens 3 may be adjusted by the focus lens driver 9 and the focus lens 3 adjusts focusing.

The light splitter 4 splits a light beam passing through an image capturing lens and a focus lens into a light beam for image capturing and a light beam for an AF system. For example, the light splitter 4 may be a half-mirror. One light beam after the splitting of the light splitter 4 is incident on the imaging sensor 6.

An optical signal transmitted through the light splitter 4 forms an image of an object on a light-receiving surface of the imaging sensor 6. The imaging sensor 6 may, for example, be a CCD image sensor or a complementary metal oxide semiconductor image sensor (CIS), or the like, for converting the optical signal into an electrical signal. The imaging sensor controller 7 temporally limits an intensity of light for the imaging sensor 6 by controlling the shutter 5 included in the imaging sensor 6. When data is read from the imaging sensor 6, the shutter 5 is closed. The imaging sensor controller 7 may be configured to control the imaging sensor 6 based on a control signal automatically generated by an image signal input in real time or a control signal manually input by the user's operation.

The phase difference AF device 8 may be a phase difference type distance measurement device which functions as a focus detection device for measuring a distance to an object after receiving light transmitted through the light splitter 4. The phase difference AF device 8 may include an AF mirror for changing a direction of an optical axis of AF, a separator lens for separating a pupil of an AF light beam, and an AF sensor for performing phase difference type distance specification (phase difference AF).

An output from the AF device 8 is input to the controller 120 and used for AF control of phase-difference AF by the AF controller 121. The AF controller 121 within the controller 120 may also perform AF control of contrast AF based on an output from the imaging element.

The analog signal processor 140 performs a noise reduction process, gain adjustment, waveform shaping, an analog-digital conversion process, etc. on an analog signal supplied from the imaging sensor 6.

The image signal processor 141 is a signal processor for processing a special function for an image data signal processed in the analog signal processor 140. For example, it is possible to reduce noise for input image data and perform image signal processing for image quality improvement and special effect provision such as gamma correction, color filter array interpolation, a color matrix, color correction, color enhancement, white balance adjustment, luminance smoothing, and color shading, or the like. The image signal processor 141 may generate an image file by compressing the input image data or restore image data from an image file. An image compression type may be a reversible type or a non-reversible type. As an example of a proper type, conversion into a Joint Photographic Experts Group (JPEG) type or JPEG 2000 type is also possible in the case of a still image. In addition, when a video is recorded, it is possible to generate a video file by compressing a plurality of frames according to the standard of Moving Picture Experts Group (MPEG). An image file, for example, may be generated according to an exchangeable image file format (Exif) standard.

The image signal processor 141 may generate a video file from an imaging signal generated by the imaging sensor 6. The imaging signal may be a signal generated by the imaging sensor 6 and processed by the analog signal processor 140. The image signal processor 141 generates frames to be included in the video file from the imaging signal. The image signal processor 141 may code the frames, for example, according to the standard of MPEG-4, H.264/AVC, Windows Media Video (WMV), or the like to compress a video and generate a video file using the compressed video. The video file may be generated in various types of mpg, mp4, 3gpp, avi, asf, and mov.

Image data output from the image signal processor 141 is input to the storage/read controller 160 through the memory 150 or may be input directly. The storage/read controller 160 stores image data in the memory card 161 based on a signal from the user or automatically. In addition, the storage/read controller 160 reads data about an image from an image file stored in the memory card 161 and may be configured to control the image to be displayed on the display 130 by inputting the read data to the display driver 131 through the memory 150 or another path. The memory card 161 may be detachable and permanently mounted in the image capturing apparatus 100. For example, the memory card 161 may be a flash memory card such as a Secure Digital (SD) card.

In addition, the image signal processor 141 may perform sharpening, color processing, blur processing, edge emphasis processing, image analysis processing, image recognition processing, image effect processing, or the like. The image recognition processing may include face recognition processing, scene recognition processing, and the like. In addition, the image signal processor 141 may perform display image signal processing to display the image on the display 130. For example, the image signal processor 141 may perform brightness level adjustment, color correction, contrast adjustment, outline emphasis adjustment, screen division processing, character image generation, image synthesis processing, or the like.

On the other hand, the image signal processed by the image signal processor 141 may be input to the controller 120 via the memory 150 or may be directly input to the controller 120 without passing the memory 150. For example, the memory 150 may operate as a main memory of the image capturing apparatus 100 and temporarily stores information necessary during the operation of the image signal processor 141 or the controller 120. The program storage 170 may store programs of an operating system, an application system, and the like that drive the image capturing apparatus 100.

In addition, the image capturing apparatus 100 includes the display 130 to display an operation state of the image capturing apparatus 100 or to display information regarding an image captured by the image capturing apparatus 100. The display 130 may provide a user with visual information. In order to provide the visual information, the display 130 may include an LCD panel, an organic light-emitting diode display panel, or the like. Also, the display 130 may include a touch screen capable of recognizing a touch input.

The display driver 131 provides a driving signal to the display 130.

The overall operation of the image capturing apparatus 100 may be controlled by the controller 120. The controller 120 may be configured to provide control signals for operations of components to the lens driver 10, the focus lens driver 9, the imaging sensor controller 7, etc.

The controller 120 may be configured to process an input image signal and therefore may be configured to control the components based on the processed image signal or an external input signal. The controller 120 may correspond to one or more processors. The processor may be implemented as an array of a plurality of logic gates or implemented as a combination of a generic-purpose microprocessor and a memory storing a program executable in the microprocessor. In addition, those skilled in the art may understand that the controller 120 may be implemented in another form of hardware.

The controller 120 is configured to execute a program stored in the program storage 170 or includes a separate module configured to generate a control signal for controlling auto focusing, a zoom change, a focus change, automatic exposure correction, or the like, provide the generated control signal to the lens driver 10, the focus lens driver 9, and the imaging sensor controller 7, and to generally control operations of the components provided in the image capturing apparatus 100 such as a shutter and a strobe.

In addition, the controller 120 may be connected to an external monitor, may be configured to perform predetermined image signal processing so that the image signal input from the image signal processor 141 is displayed on the external monitor, and to then may transmit processed image data to allow a corresponding image to be displayed on the external monitor.

The manipulator or input 180 allows input of a control signal such as, for example, by a user. The manipulator 180 may include various function buttons such as a shutter-release button 181 for inputting a shutter-release signal to allow an image to be captured by exposing the imaging sensor 6 to light during a predetermined time period, a zoom button 182 for widening and narrowing an angle of view according to an input, a power button 183 for inputting a control signal to control power on or off, a mode selection button, an image-capturing setting value adjustment button, or the like. The manipulator 180 may be embodied in one of various forms including buttons, a keyboard, a touchpad, a touchscreen, a remote controller, and the like via which a user may input a control signal.

The shutter-release button 181 may have a two-stage switch structure having an image-capturing preparation startup switch SW1 and an image capturing start switch SW2. The zoom button 182 is a manipulation switch for changing a focus distance of the image capturing apparatus. In addition, the focus lens 3 is controlled by the AF controller 121 through the focus lens driver 9 based on results of phase-difference AF and contrast AF. In addition, based on manipulation of the zoom button, the image capturing lens 1 related to a change in a focus distance is controlled by the controller 120 through the lens driver 10. Because the position of the image capturing lens 1 is transmitted from the focus distance detector 11 to the controller 120, the focus distance of the image capturing lens 1 may be constantly detected.

In addition, according to an example embodiment, the manipulator or input 180 may further include a Z-axis trap shot mode button 184. When the Z-axis trap shot mode button 184 is pressed, the image capturing apparatus 100 may enter a mode in which the user captures an image of an object at a desired distance on the Z axis according to an example embodiment.

The communicator 190 may be configured to include a network interface card (NIC), a modem, etc., and may perform a function of enabling the image capturing apparatus 100 to communicate with an external device through a network in a wired/wireless manner.

Figure 3B:
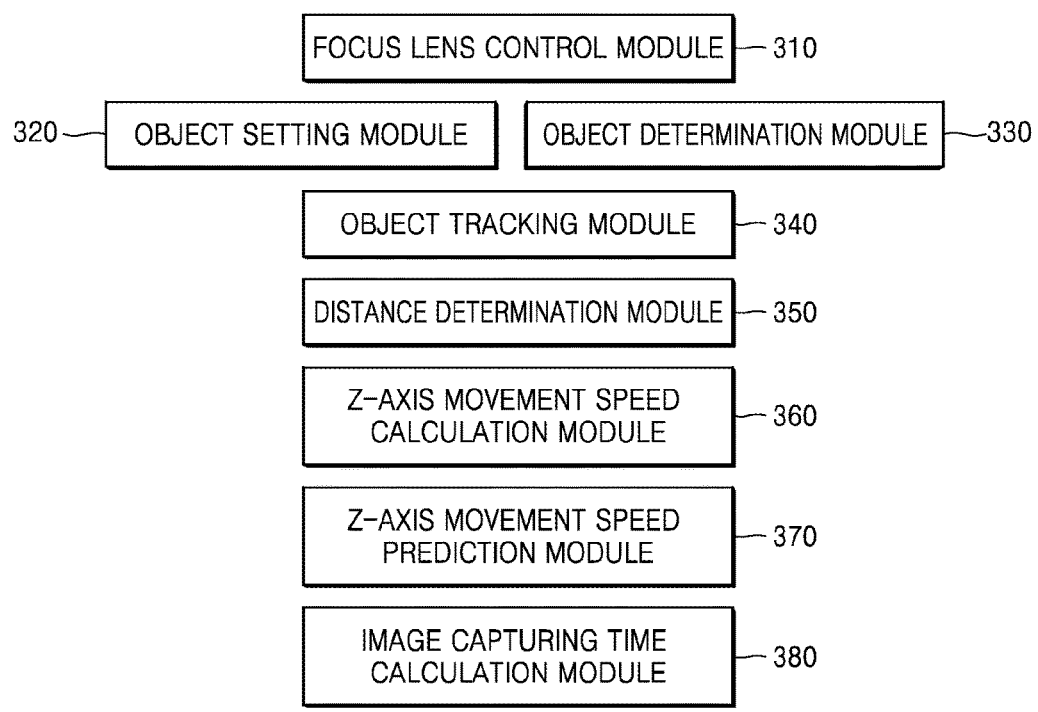
FIG. 3B is a diagram illustrating an example module capable of being stored in a program storage 170 to perform a method of operating the image capturing apparatus.

FIG. 3B is a diagram illustrating an example module capable of being stored in the program storage 170 illustrated in FIG. 3A to perform a method of operating the image capturing apparatus.

Referring to FIG. 3B, the program storage 170 includes, for example, a focus lens control module 310, an object setting module 320, an object determination module 330, an object tracking module 340, a distance determination module 350, a Z-axis movement speed calculation module 360, a Z-axis movement speed prediction module 370, and an image capturing time calculation module 380.

The focus lens control module 310 may include one or more instructions for controlling the focus lens.

The object setting module 320 may include one or more instructions for setting a region of an object of an image to be captured within a screen.

The object determination module 330 may include one or more instructions for determining the object even when the object region is not set.

The object tracking module 340 may include one or more instructions for tracking the object region.

The distance determination module 350 may include one or more instructions for calculating the object distance based, for example, on a phase difference or a depth map.

The Z-axis movement speed calculation module 360 may include one or more instructions for calculating a movement speed of the object.

The Z-axis movement speed prediction module 370 may include one or more instructions for predicting a time until the object moves to a set position.

The image capturing time calculation module 380 may include one or more instructions for calculating an image capturing time point, for example, a point in time at which the image sensor starts to be exposed, taking into account the shutter release lag of a camera so that a focus is suitable for a focus lens taking into account a movement speed of the object and generating a shutter-release signal to capture an image.

Figure 4:
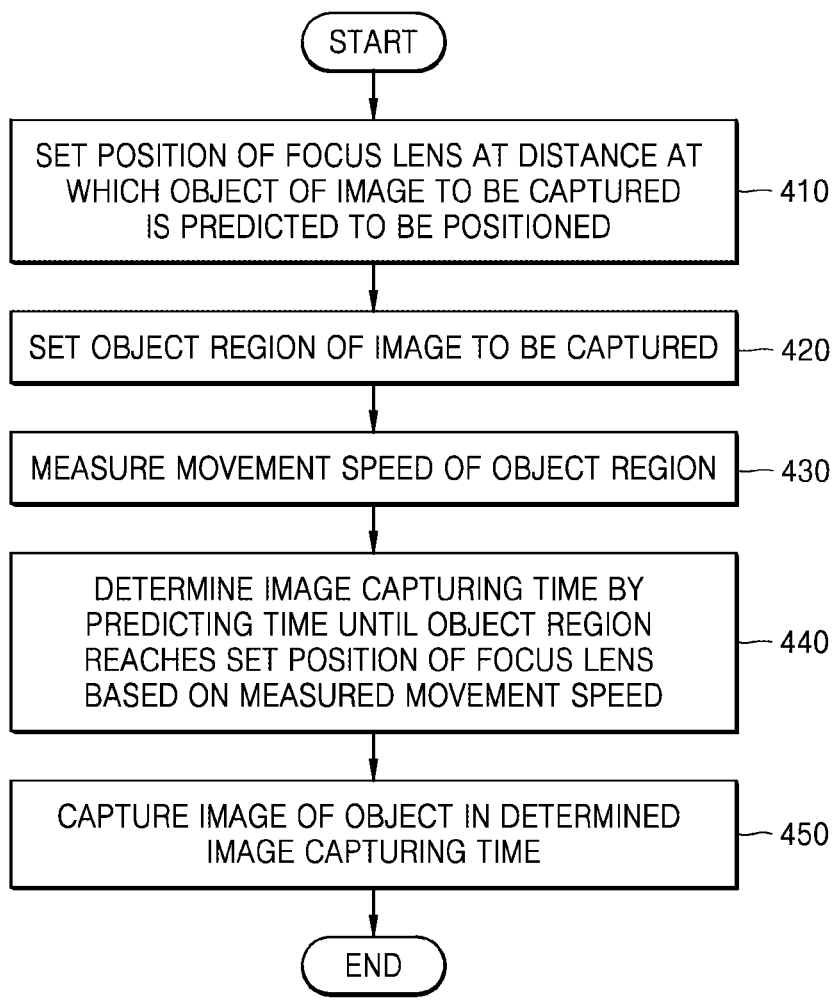
FIG. 4 is a flowchart illustrating an example process of the method of operating the image capturing apparatus.

FIG. 4 is a flowchart illustrating an example process of the method of operating the image capturing apparatus. The operation of the image capturing apparatus illustrated in FIG. 4, for example, may be performed to enable the image capturing apparatus 100 to capture an image at a distance on the Z axis desired by the user when the user presses the Z-axis trap shot mode button 184 included in the manipulator or input 180.

Referring to FIG. 4, in operation 410, the image capturing apparatus 100 may set a position of the focus lens at a distance at which an object of an image to be captured is predicted to be positioned.

According to an example embodiment, the controller 120 of the image capturing apparatus 100 may be configured to set the position of the focus lens at the distance at which the image of the object is desired to be captured using the focus lens control module 310.

Figure 5B:
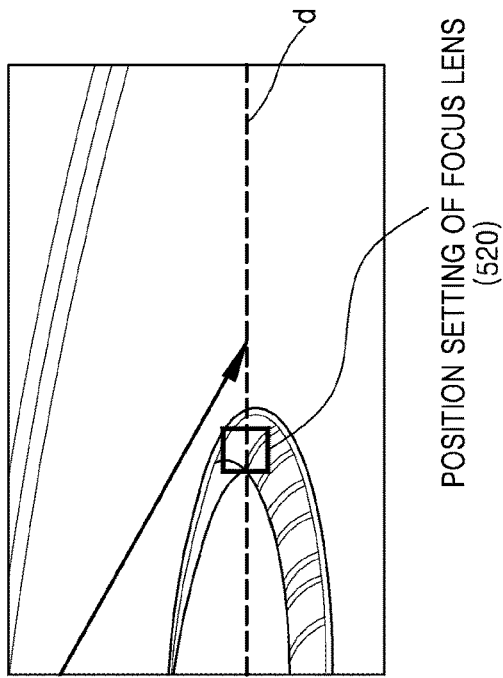
FIGS. 5A and 5B are diagrams illustrating an example operation of setting a position of a focus lens.

The image capturing apparatus 100 may be configured to set the position of the focus lens at the distance at which the image of the object is desired to be captured or set the position of the focus lens so that another object positioned at the distance at which the image of the object is desired to be captured is in focus. For example, referring to FIG. 5A, the position of the focus lens may be set at the distance d at which the image of the object is desired to be captured, for example, at one point 510 of the track bottom. In addition, for example, referring to FIG. 5B, the position of the focus lens may be set so that another object positioned at the distance at which the image of the object is desired to be captured is in focus, for example, the position of the focus lens may be set so that a structure 520 positioned at the same distance d is in focus. A process of setting the position of the focus lens at the structure 520 in which there is an object may be easier than a process of setting the position of the focus lens at the point 510 at which there is no object.

Another example in which the position of the focus lens is set will be described in greater detail below with reference to FIG. 7A.

Figure 7B:
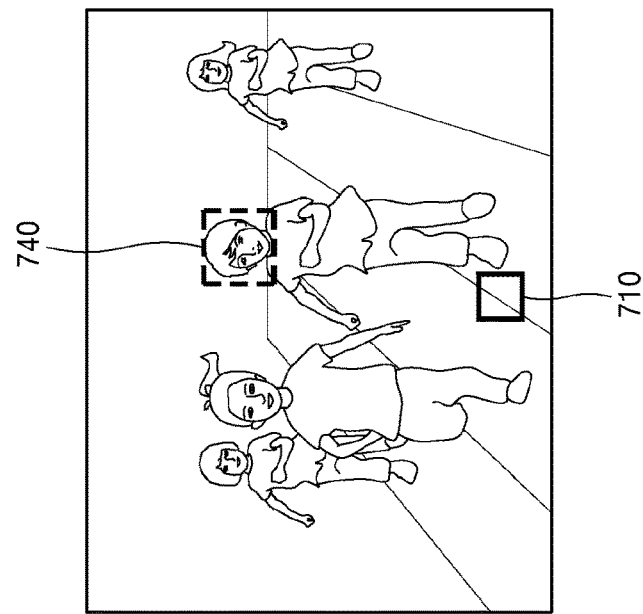
FIGS. 7A and 7B are diagrams illustrating an example operation of setting an object region.
Figure 7A:
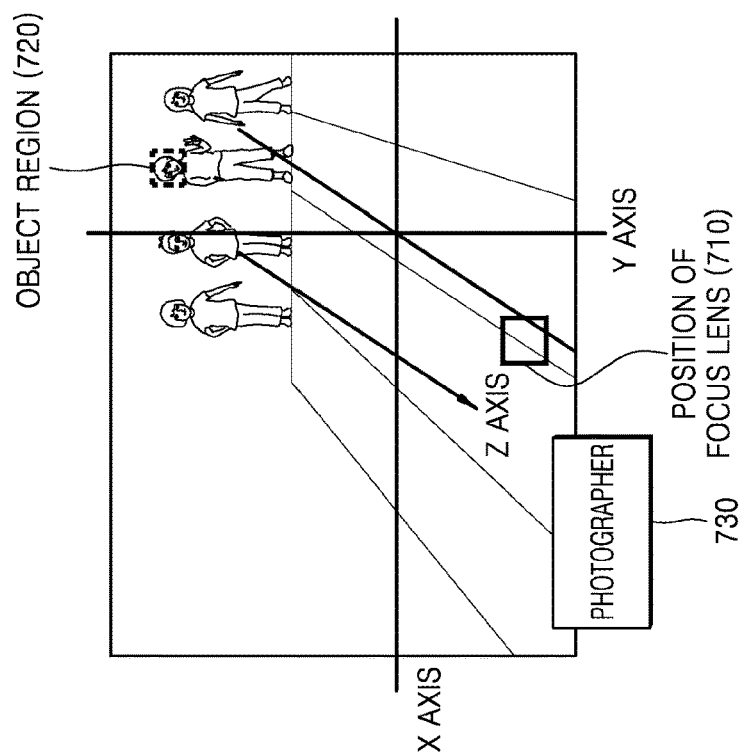

For example, as illustrated in FIG. 7A, a photographer 730 is positioned at a front position of a running lane at a sporting event, and the X axis represents a width of the running lane, the Y axis represents a height from the ground, and the Z axis represents a distance from a child who is an object to the photographer in a captured image of a child running toward the photographer. The photographer 730 may set the position of the focus lens at a position 710 at which the object which runs from a far position of the running lane to the photographer may be easily identified.

When the image capturing apparatus 100 sets the position of the focus lens, the focus lens is locked after the focus is set at a corresponding position.

The position of the focus lens may be set automatically or manually. This will be described in greater detail below.

In operation 420, the image capturing apparatus 100 sets a region of an object of an image to be captured.

According to an example embodiment, the controller 120 of the image capturing apparatus 100 may be configured to set a region of the object of the image to be captured using the object setting module 320.

For example, the photographer may set a car which starts to appear at a rear position of a track as an object region 610 in a car race image illustrated in FIG. 6A.

For example, in the image of running at the sporting event illustrated in FIG. 7A, the photographer may set a child who prepares to run from a starting line of the running lane as an object region 720.

Figure 5A:
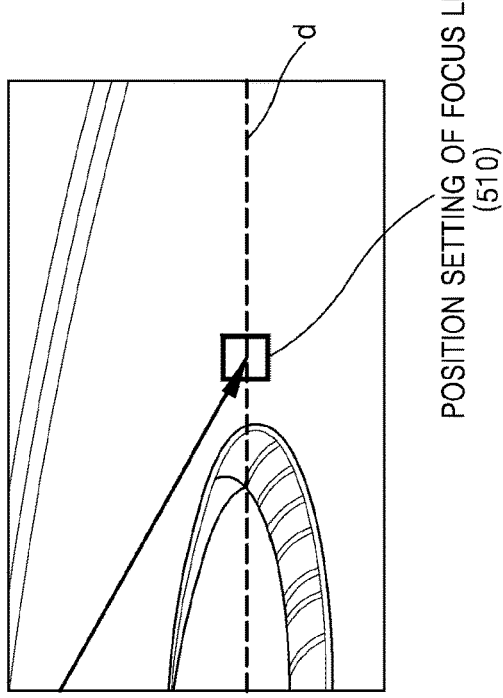

In the example of a car track image illustrated in FIG. 5A, no object may appear in the screen. In this example, because the photographer does not set the object region, another method of automatically determining the object region may be used. A method of automatically determining the object region when no object appears on the screen and the object region is not set will be described in greater detail below.

The object region may be set automatically or manually.

In operation 430, the image capturing apparatus 100 measures a movement speed of the object region.

According to an example embodiment, the controller 120 of the image capturing apparatus 100 may be configured to measure the movement speed of the object region using an object tracking module 340, a distance determination module 350, a Z-axis movement speed calculation module 360, etc.

The object tracking module 340 may detect a position change (changes on the X and Y axes) of the object region when the object starts to move on the screen and update coordinates of the object region. The object tracking module 340 may detect the position change on the screen using object tracking, face detection, or the like.

The object tracking module 340 may track only the object region in the image or move the focus lens while tracking the object to secure a more precise phase-difference AF value. An example in which the focus lens is locked after a focus is set at a corresponding setting position when the position of the focus lens is set in operation 410 has been described, but example embodiments of the present disclosure are not limited thereto. For example, because it is preferable to move the focus lens to accurately track the object, it is possible to move the focus lens after storing the setting position of the focus lens in a separate memory. Because the image capturing apparatus predicts the movement speed of the object region and calculates an image capturing time in advance as will be described below, it is possible to move the focus lens to the setting position stored in the memory before the image capturing time is reached and therefore capture an image of the object at the focus lens position at the calculated image capturing time.

The distance determination module 350 may detect distance information of the object region and deliver the distance information to the Z-axis movement speed calculation module 360.

The distance determination module 350 may obtain a distance from the object through an AF algorithm or a depth map of a stereo camera using a lens formula.

The lens formula for calculating the focus distance from the position of the focus lens is as follows.

Figure 8:
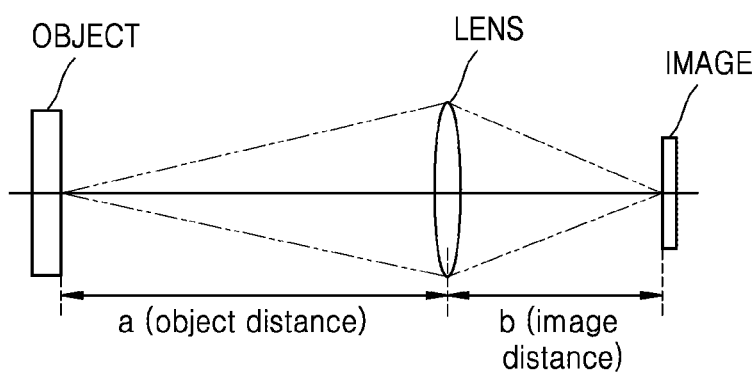
FIG. 8 is a diagram illustrating an example relation between an object distance and an image distance.

Referring to FIG. 8, a indicates a distance from the object to the lens, b indicates a distance from the lens to the image, and f indicates a lens focal length.

A relation between the object distance a and the image distance b is shown by the following lens formula.

$$\frac{1}{a} + \frac{1}{b} = \frac{1}{f}$$

A multi-camera system includes two or more camera modules and it is possible to detect a focus for a specific object or generate a stereoscopic image using images input from the camera modules. For example, the multi-camera system may determine a disparity from two images input from two cameras installed on the left and right to detect a position of a specific object. For example, the multi-camera system may detect a position at which the object displayed at a specific position within one image is displayed in the other image and extract a difference (disparity) between the two positions. The multi-camera system may detect a focus for the specific object or determine values of distances from two cameras to the specific object using the disparity.

The Z-axis movement speed calculation module 360 may calculate the movement speed of the object region using the distance information received from the distance determination module 350.

In operation 440, the image capturing apparatus 100 determines an image capturing time by predicting a time until the object region reaches the set position of the focus lens based on the measured movement speed.

According to an example embodiment, the controller 120 of the image capturing apparatus 100 may be configured to determine the image capturing time using the Z-axis movement speed prediction module 370 and the image capturing time calculation module 380.

The Z-axis movement speed prediction module 370 may predict a time at which a focus will be accurately set on an object using a moving-object prediction function when the object region is close to the focus lens setting position.

The Z-axis movement speed prediction module 370 may detect the speed of the object through the moving-object prediction function and calculate an appropriate exposure time. The speed of the shutter may be determined according to the appropriate exposure time. It is possible to make the captured image clear by lengthening exposure in an image in which an intensity of light is low and shortening the exposure in an image in which the intensity of light is high. For example, when an image of the car which is an object in a car race is captured or an image of a running child is captured as an object, a situation to which this example embodiment is applied may be the case in which the movement speed of the object is fast. Accordingly, when an image of the moving object is captured, it may be necessary to appropriately adjust the exposure time. According to an example embodiment, it is possible to determine an exposure time suitable for the predicted movement speed because the image capturing apparatus 100 may predict the movement speed of the object through the Z-axis movement speed prediction module 370. The controller 120 of the image capturing apparatus 100 may be configured to provide a control signal to the imaging sensor controller 7 using the calculated exposure time.

The image capturing time calculation module 380 may receive a time at which a focus is accurately set on the object from the Z-axis movement speed prediction module 370 and calculate the optimum or substantially optimum shutter release timing taking into account a shutter release lag. The image capturing time calculation module 380 may provide a release signal to the image capturing unit 110 when the calculated optimum shutter release timing is reached.

Figure 9:
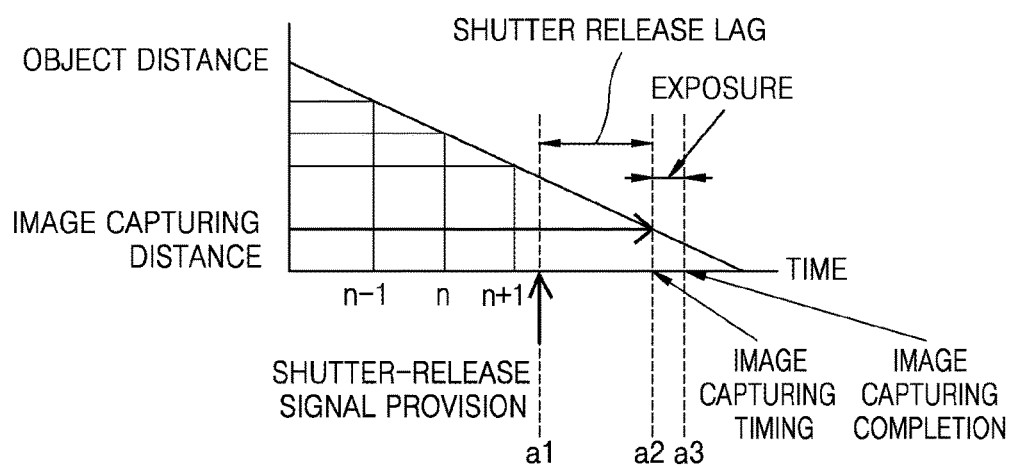
FIG. 9 is a diagram illustrating an example process in which an image capturing time calculation module 680 calculates the optimum shutter release timing.

FIG. 9 is a diagram illustrating an example process in which the image capturing time calculation module 380 calculates the optimum shutter release timing.

Assuming that the object performs uniform motion, it is possible to calculate the image capturing timing using a simple linear function because the image capturing timing is linear as illustrated in FIG. 9.

The distance to the object may be calculated as phase-difference AF or depth information using a lens formula. It is possible to calculate the movement speed of the object through the phase-difference AF information or the depth information from an equal interval image (live view image). In addition, the camera knows the shutter release lag. Accordingly, the image capturing time calculation module 380 calculates a release signal output time by subtracting the shutter release lag time from a time until the object reaches an image capturing distance. It is possible to acquire an image of the object at the timing at which a focus is accurately set on the object when the release signal is output from the image capturing time calculation module 380.

Referring to FIG. 9, the horizontal axis of the graph represents time and the vertical axis represents a distance of an object. According to the passage of time, the distance of the object is close to an image capturing distance. The image capturing timing at the image capturing distance is a2, but timing a1 which is the shutter release lag time and is earlier than the image capturing timing a2 may be determined as a time at which the shutter-release signal is provided taking into account the shutter-release signal in this exemplary embodiment. When the timing at which the shutter-release signal is provided is determined to be a1 as described above, exposure accurately starts at the image capturing timing a2 and image capturing starts. Image capturing is complete at timing a3 When the exposure time has elapsed, the image capturing may be completed. Because the image capturing apparatus 100 predicts the movement speed of the object as described above, it is possible to appropriately determine an exposure time by referring to the predicted movement speed.

In operation 450, the image capturing apparatus 100 captures an image of the object at the determined image capturing time.

According to an example embodiment, the controller 120 of the image capturing apparatus 100 may be configured to control the image capturing unit 110 to capture an image of the object at the image capturing time determined using the image capturing time calculation module 380. For example, the image capturing time calculation module 380 may provide the imaging sensor controller 7 with the shutter-release signal at the timing that is the shutter release lag time and is earlier than the image capturing timing at a distance at which the image of the object is captured. The imaging sensor controller 7 captures an image of the object while controlling the opening/closing of the shutter 5 of the imaging sensor 6.

For example, as illustrated in FIG. 6B, the image capturing apparatus 100 may capture an image of an object 620 in focus at a focus lens setting position of the structure 520.

For example, as illustrated in FIG. 7B, the image capturing apparatus 100 may capture an image of an object 740 in focus at a focus lens setting position 710.

According to an example embodiment, the focus lens position setting of operation 410 illustrated in FIG. 4 may be performed automatically or manually.

According to an example embodiment, as one manual setting method, a position of a focus lens may be set so that a focus is set on another object at the same distance as that at which an object of an image to be captured is predicted to be positioned by adjusting a focus ring of the lens. The focus ring is arranged outside the lens and configured to be rotated by the user. When the user rotates the focus ring, the image capturing apparatus adjusts focusing by moving one or more lenses. According to an example embodiment, the image capturing apparatus may set the position of the focus lens so that another object is in focus when the focus ring of the lens is adjusted so that the other object is in focus at the distance at which the object of the image to be captured by the user is predicted to be positioned. Of course, it is possible to simply set the position of the focus lens at a predicted distance if there is no other object at the distance at which the object of the image to be captured by the user is predicted to be positioned.

The image capturing apparatus 100 may set the position of the focus lens by displaying a region in focus as in focus peaking. The focus peaking is a function of supporting focusing in live preview or electronic viewfinders in a digital camera. In the focus peaking function, a part on which a focus is currently set is displayed to the user by positioning a white or colored highlight on an in-focus edge within an image using an edge detection filter.

According to an example embodiment, as one automatic setting method, it is possible to set the position of the focus lens by positioning another object at the same distance as that at which the object of the image to be captured is predicted to be positioned in a currently set AF region or center AF region and performing a half shutter press.

The shutter-release button provided in the manipulator/input of the image capturing apparatus may, for example, maintain three states. The three states are an image capturing standby state before the shutter-release button is pressed, a half pressed shutter state in which a focus is set by half pressing the shutter-release button, and a fully pressed shutter state in which the shutter-release button is fully pressed and image capturing is in progress. When the user positions another object in the currently set AF region or the center AF region and performs the half shutter press, the image capturing apparatus may set the focus lens position at which a corresponding object is in focus.

Figure 10A:
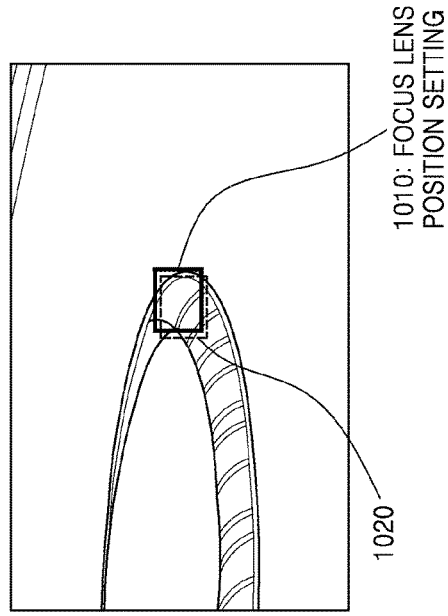
FIGS. 10A to 10C are diagrams illustrating an example method of setting a position of a focus lens by positioning an object in an AF region and performing a half shutter press.
Figure 10B:
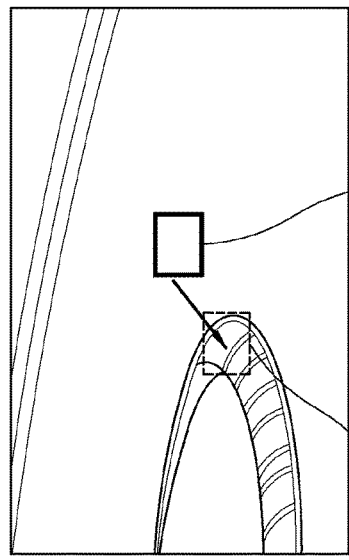
Figure 10C:
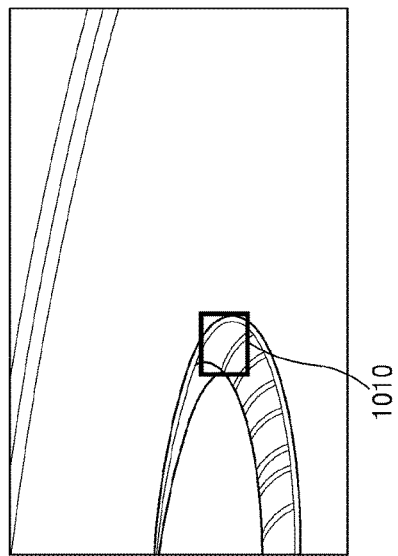

FIGS. 10A to 10C are diagrams illustrating an example method of setting a position of a focus lens by positioning an object in an AF region and performing the half shutter press.

Referring to FIG. 10A, for example, the image capturing apparatus 100 sets an AF region 1010 in the center of the car track image. However, a focus lens target position desired by the user is denoted by reference numeral 1020. The user may move the AF region 1010 to the target position 1020 by moving the image capturing apparatus 100 to a lower left portion as illustrated in FIG. 10B. In a state in which the AF region 1010 is positioned at the target position 1020, the image capturing apparatus 100 may set the position of the focus lens at the target position 1020 when the user half presses the shutter as illustrated in FIG. 10C.

According to an example embodiment, it is possible to set the position of the focus lens by performing AF based on a touched region after another object at the same distance as that at which the object of the image to be captured is predicted to be positioned is touched on the screen as one automatic setting method.

Figure 11:
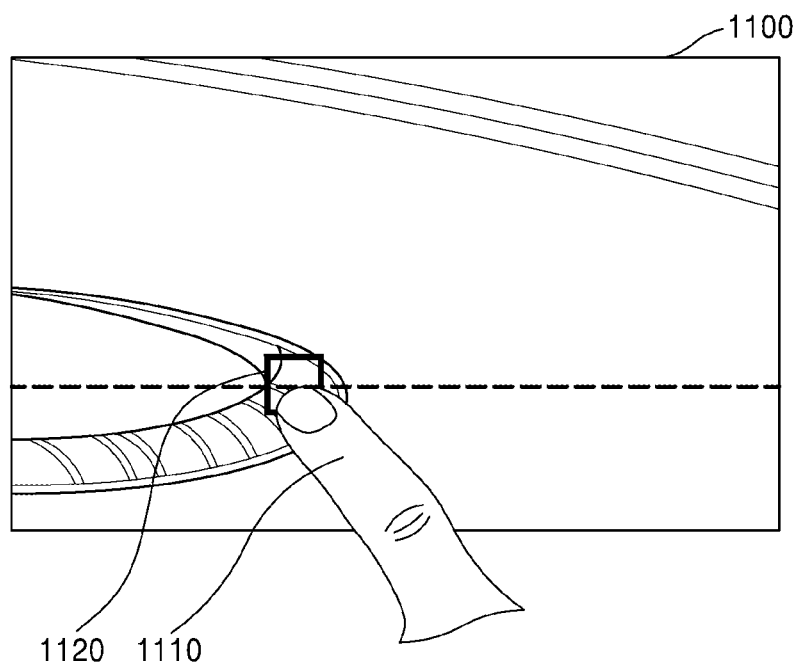
FIG. 11 is a diagram illustrating an example screen 1100 displayed on a display.

FIG. 11 illustrates a screen 1100 displayed on the display 130.

Referring to FIG. 11, when an object 1120 at the same distance as that at which the object of the image to be captured is predicted to be positioned is touched using an input 1110 such as, for example, the user's finger on the screen displayed on the display 130, the image capturing apparatus 100 may recognize a region of the object 1120 touched by the input and set the position of the focus lens by performing AF based on the region. Of course, for this touch input recognition, the display 130 may be implemented as a touch sensitive screen.

According to an example embodiment, a process of setting a region of an object of an image to be captured in operation 420 illustrated in FIG. 4 may be automatically performed without an input from the user or manually performed based on an input from the user.

According to an example embodiment, the image capturing apparatus 100 may select the object region through a touch or region selection when the object of the image to be captured initially is displayed on the screen as one manual setting method.

Figure 12:
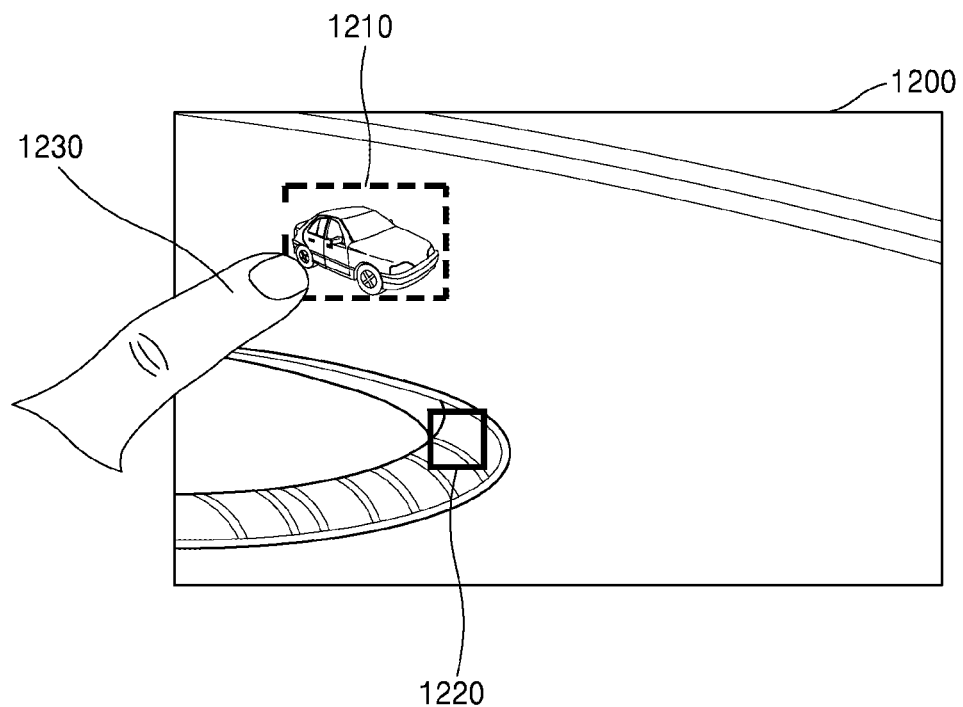
FIG. 12 is a diagram illustrating an example operation of selecting an object region positioned on the screen based on an input.

For example, when the object of the image to be captured is displayed on a screen 1200 as illustrated in FIG. 12, the user may touch or select a corresponding object 1210 using an input 1230 such as the finger or the image capturing apparatus 100 may set the object region by detecting an input received through the display 130 configured as a touch screen. Object 1220 corresponds generally to object 1120 discussed above.

According to an example embodiment, the image capturing apparatus 100 may select a region in which an object is predicted to be displayed through a touch or region selection when there is no object of an image to be captured on the screen as one manual setting method.

Figure 13:
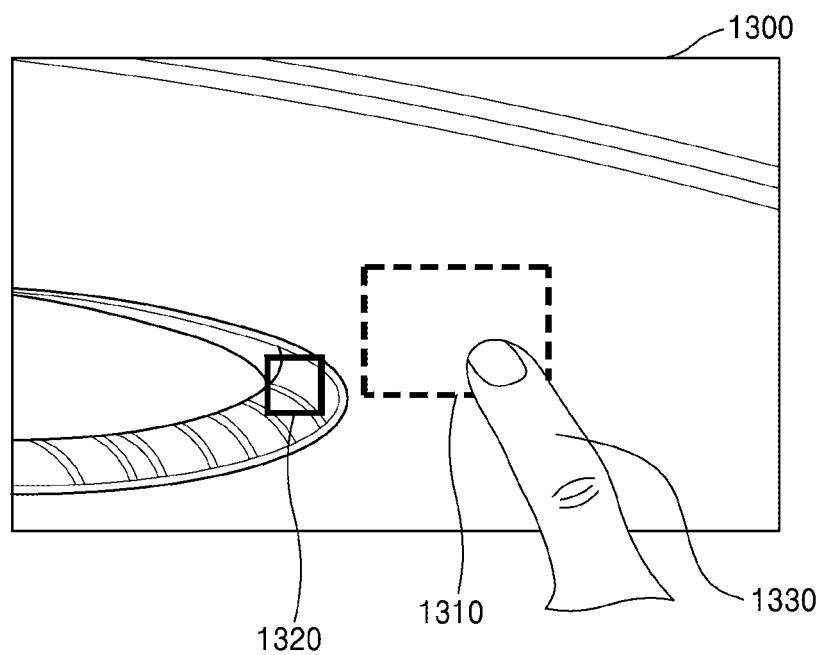
FIG. 13 is a diagram illustrating an example operation of selecting an object region absent from the screen based on an input.

For example, even when an object of an image to be captured is not yet displayed on a screen 1300 as illustrated in FIG. 13, the user may input an object region by touching or selecting a region 1310 in which the object is predicted to be displayed at a position close to the focus lens setting position 1320 using an input 1330 such as the finger and the image capturing apparatus 100 may set the object region by detecting an input received through the display 130 including the touch screen.

According to an example embodiment, the image capturing apparatus 100 may arbitrarily divide the entire screen into regions, measure a distance and a Z-axis direction movement speed of each region, and set a region in which the movement speed is detected as an object region as one automatic setting method. It is possible to automatically capture an image by tracking a corresponding region.

Figure 14:
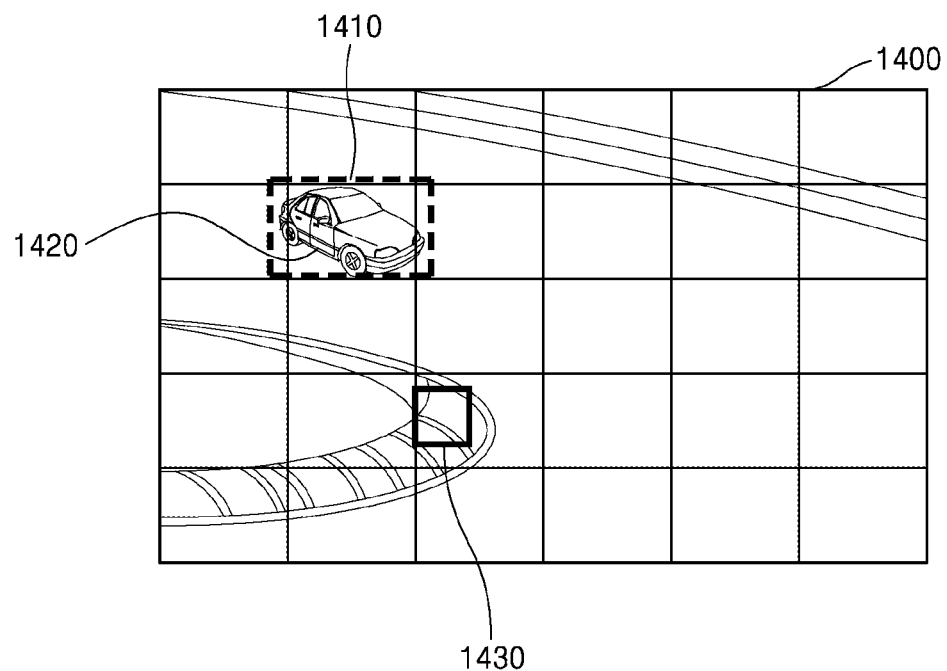
FIG. 14 is a diagram illustrating an example process of automatically setting an object region.

Referring to FIG. 14, the image capturing apparatus 100 may divide an entire screen 1400 into two or more sub-regions. For example, referring to FIG. 14, the image capturing apparatus 100 may divide the screen 1400 into 5×6 sub-regions and measure a distance and a Z-axis direction movement speed of each division sub-region. The image capturing apparatus 100 may set the region in which the movement speed is detected among the sub-regions as the object region. Referring to FIG. 14, the image capturing apparatus 100 may detect the movement speed in a sub-region 1410 including an object 1420. Accordingly, the image capturing apparatus 100 may set the sub-region 1410 as the object region. Object 1430 corresponds to a position close to the focus lens setting position as discussed in greater detail below.

FIGS. 15A to 15D are diagrams illustrating an example operation of detecting a sub-region including an object, setting the sub-region as an object region, and performing tracking and automatic image capturing.

Referring to FIG. 15A, the image capturing apparatus 100 detects the sub-region 1410 in which the movement speed of the object 1420 is detected and sets the sub-region 1410 as the object region.

Referring to FIG. 15B, the image capturing apparatus 100 tracks the movement of the object region 1410 and tracks a coordinate change of the object region 1410 to determine a distance of the object region 1410 and measure a movement speed.

Referring to FIG. 15C, the image capturing apparatus 100 predicts a time until the object region 1410 reaches a focus lens setting position 1430 when the object region 1410 is close to the focus lens setting position 1430 and calculates the timing for providing a shutter-release signal taking into account the shutter release lag.

Referring to FIG. 15D, the image capturing apparatus 100 may capture an image in which the focus is accurately set on the object region 1410 when the object region 1410 reaches the focus lens setting position 1430 by providing a shutter-release signal to the image capturing unit at the previously calculated timing at which the shutter-release signal is provided before the object region 1410 reaches the focus lens setting position 1430.

According to an example embodiment, the image capturing apparatus 100 may arbitrarily divide the entire screen into regions, measure a distance and a Z-axis direction movement speed of each fixed region, and start automatic image capturing when a region predicted to be in focus at the set focus lens position is detected as one automatic setting method.

FIGS. 16A to 16C are diagrams illustrating an example method of automatically detecting an object without setting an object region.

Referring to FIG. 16A, the image capturing apparatus 100 divides the screen into a plurality of sub-regions. An example in which the screen is divided into 5×6 sub-regions is illustrated in FIG. 16A. The image capturing apparatus 100 may detect motion in each of the plurality of sub-regions based on the division and measure a distance and a Z-axis direction movement speed of each region when there is motion.

In the screen as illustrated in FIG. 16A, the object 1420 is illustrated to be shown on the track. The focus lens setting position 1430 is at a front position of the track. Accordingly, a position at which an image of the object 1420 is to be captured may be schematically a sub-region 1620. In order to capture an image of the object 1420 in a sub-region 1620, it is necessary to monitor the motion of the object from the sub-region 1610 before the object 1420 is shown in the sub-region 1620. Accordingly, when the focus lens setting position 1430 is determined, the image capturing apparatus 100 may monitor the distance of the object and set sub-regions 1610 and 1620 in which the image of the object is captured. Of course, the screen is divided into 5×6 regions in FIG. 16A as an example, but may be divided into units of smaller regions to detect accurate motion of the object. In addition, the motion of the object starts to be detected and the region in which the image of the object is captured is displayed as the sub-regions 1610 and 1620 in FIG. 16A, but this is only an example. If the sub-regions 1610 and 1620 are regions for preparing to capture an image of the object at the focus lens setting position 1430, the regions may be determined in any form.

Referring to FIG. 16B, a state in which the object 1420 enters the sub-region 1610 according to the passage of time is illustrated. Because the image capturing apparatus 100 monitors motion detection in the sub-region 1610 and the sub-region 1620, the image capturing apparatus 100 may measure the distance and the Z-axis movement direction speed in the sub-region 1610 when the object 1420 moves in the sub-region 1610. The image capturing apparatus 100 may calculate a time until the object reaches the focus lens setting position 1430 based on the movement speed of the object in the sub-region 1610 and determine the image capturing timing based on the calculated time.

After the image capturing timing is determined, the image capturing apparatus 100 may provide a shutter-release signal to the image capturing unit 110 taking into account the shutter release lag at the image capturing timing.

Referring to FIG. 16C, the image capturing apparatus 100 may accurately capture an image of an object at a point in time at which the motion of the object is detected in the sub-region 1620 as illustrated in FIG. 16C because the shutter-release signal is provided to the image capturing unit taking into account the shutter release lag in advance in the state of FIG. 16B before the object 1420 arrives at the focus lens setting position 1430.

According to an example embodiment, the image capturing apparatus 100 may set a plurality of object regions and capture images of a plurality of objects using a continuous shooting function.

When the region of the object of the image to be captured in operation 420 illustrated in FIG. 4 is set, the image capturing apparatus 100 may automatically set a plurality of object regions without an input from the user or manually set the plurality of object regions based on the input from the user.

According to an example embodiment, the image capturing apparatus 100 may manually set the plurality of object regions on the screen. A process of manually setting the plurality of object regions, for example, may be performed by the user touching and inputting the plurality of object regions or selecting the plurality of object regions.

Figure 17:
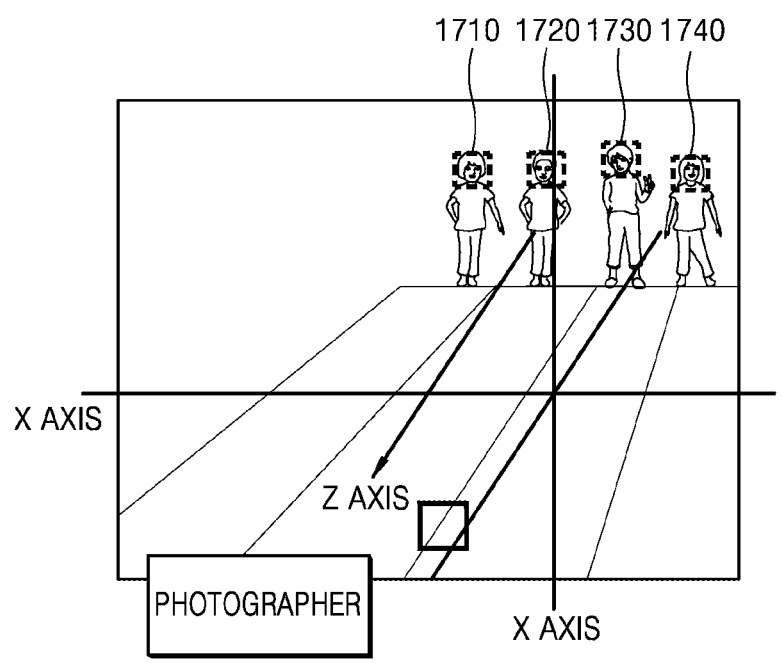
FIG. 17 is a diagram illustrating an example process of selecting a plurality of object regions.

FIG. 17 is a diagram illustrating an example process of selecting a plurality of object regions.

The user may set a plurality of objects corresponding to one or more children joining a running race. For example, referring to FIG. 17, the user may set a first object region 1710, a second object region 1720, a third object region 1730, and a fourth object region 1740. The image capturing apparatus 100 detects the user's input in which the first object region 1710, the second object region 1720, the third object region 1730, and the fourth object region 1740 are touched on the screen displayed on the display 130 implemented, for example, as a touch screen and sets the touch-input regions from the first object region 1710 to the fourth object region 1740 as the plurality of object regions. Alternatively, the user may receive an input for selecting the first object region 1710, the second object region 1720, the third object region 1730, and the fourth object region 1740 from the screen displayed on the display 130 to set the first to fourth object regions 1710 to 1740 as the plurality of object regions.

When the plurality of object regions are set, the image capturing apparatus 100 tracks each of the plurality of object regions by performing the operation as illustrated in FIG. 4 on each of the plurality of object regions, calculates the image capturing timing for each of the plurality of object regions, and provides the image capturing unit 110 with the shutter-release signal corresponding to each object region, thereby capturing an image at the focus lens setting position for each of the plurality of object regions.

According to an example embodiment, the image capturing apparatus 100 may automatically detect a plurality of object regions without receiving an input for setting the plurality of object regions from the user and set the plurality of detected object regions.

FIGS. 18A to 18D are diagrams illustrating an example process of automatically setting a plurality of object regions.

Figure 18A:
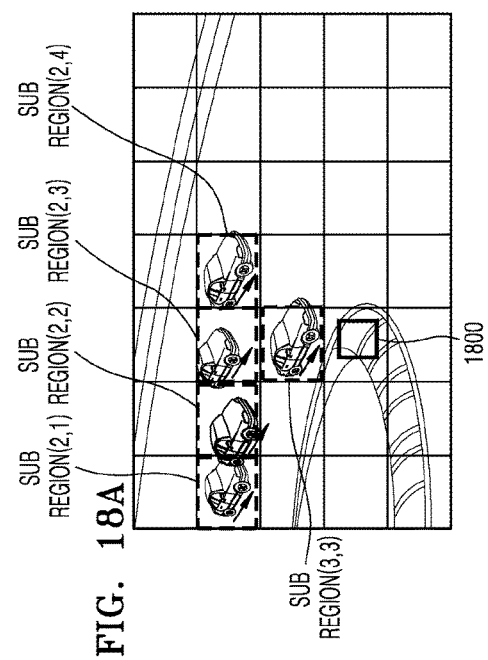
FIGS. 18A to 18D are diagrams illustrating an example process of automatically setting a plurality of object regions.

FIG. 18A is a screen in which an image of a car track is desired to be captured.

The image capturing apparatus 100 may divide the screen into a plurality of sub-regions. Referring to FIG. 18A, 5×7 sub-regions into which the image capturing apparatus 100 divides the screen are illustrated.

The image capturing apparatus 100 may measure a distance and a movement speed in each of the plurality of sub-regions after the division and set the sub-region in which the motion is detected as an object region.

For example, referring to FIG. 18A, the image capturing apparatus 100 may detect the motion in a first sub-region (2, 1), a second sub-region (2, 2), a third sub-region (2, 3), a fourth sub-region (2, 4), and a fifth sub-region (3, 3). Accordingly, the image capturing apparatus 100 may set the first sub-region as a first object region, set the second sub-region as a second object region, set the third sub-region as a third object region, set the fourth sub-region as a fourth object region, and set the fifth sub-region as a fifth object region.

Figure 18B:
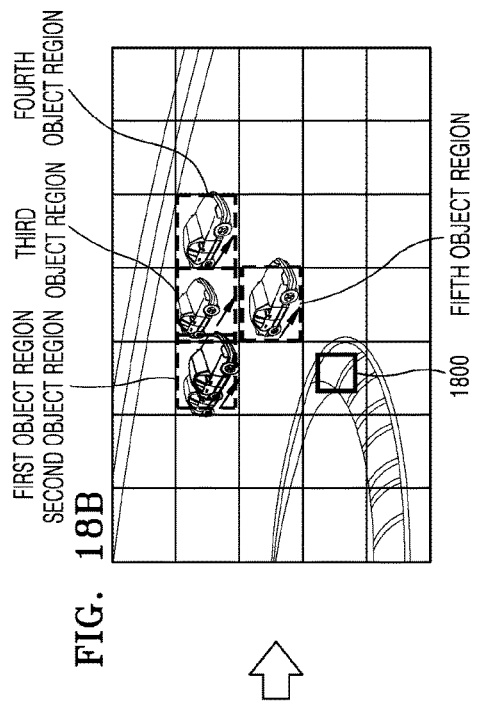

Referring to FIG. 18B, an example in which the first to fifth object regions move further toward the focus lens setting position 1800 is illustrated. Because the fifth object region is close to the focus lens setting position 1800, the image capturing apparatus 100 may calculate a time until the fifth object region reaches the focus lens setting position 1800 according to prediction of a movement speed of the fifth object region and determine the image capturing timing. In addition, the image capturing apparatus 100 may provide the image capturing unit 110 with a shutter-release signal taking into account the determined image capturing timing in advance so that an image is captured when the fifth object region is in focus at the focus lens setting position 1800.

Figure 18C:
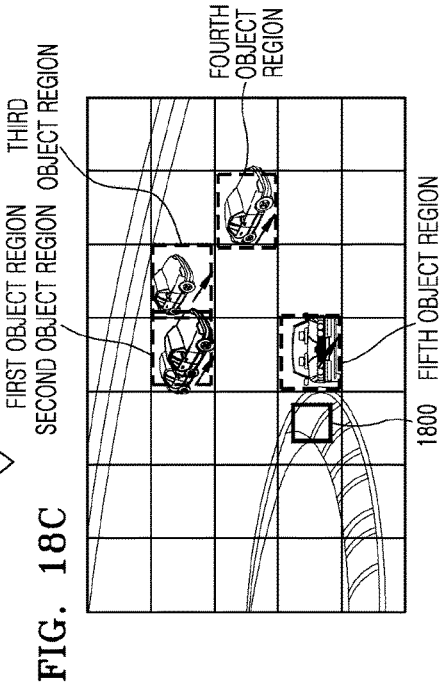

Referring to FIG. 18C, the image capturing apparatus 100 may acquire an image when the fifth object region arrives at the focus lens setting position 1800. In addition, because the fourth object region is close to the focus lens setting position 1800, the image capturing apparatus 100 may calculate a time until the fourth object region reaches the focus lens setting position 1800 according to prediction of a movement speed of the fourth object region and determine the image capturing timing.

Figure 18D:
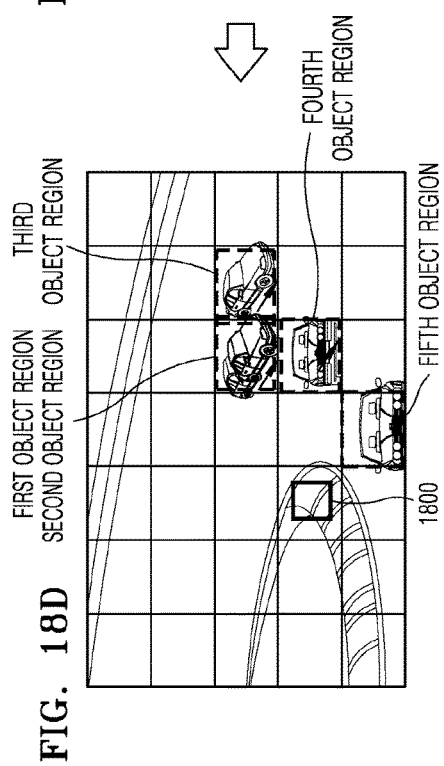

Referring to FIG. 18D, the image capturing apparatus 100 may acquire an image when the fourth object region reaches the focus lens setting position 1800.

When the plurality of object regions are set based on motion detection as described above, the image capturing apparatus 100 tracks each of the plurality of object regions by performing the operation as illustrated in FIG. 4 on each of the plurality of object regions, calculates the image capturing timing for each of the plurality of object regions, and provides the image capturing unit 110 with the shutter-release signal corresponding to each object region, thereby capturing an image at the focus lens setting position for each of the plurality of object regions.

According to an example embodiment, the image capturing apparatus 100 may automatically detect a plurality of object regions without receiving an input for setting the plurality of object regions from the user and capture an image when motion is detected in a region close to the focus lens setting position without tracking the detected object region.

FIGS. 19A to 19D are diagrams illustrating an example process of detecting a plurality of objects without setting an object region to capture an image.

The image capturing apparatus 100 may divide the screen into a plurality of sub-regions. Referring to FIG. 19A, 5×7 sub-regions into which the image capturing apparatus 100 divides the screen are illustrated.

The image capturing apparatus 100 measures a distance and a movement speed in each of the plurality of sub-regions after the division and determines whether motion is detected.

For example, referring to FIG. 19A, the image capturing apparatus 100 may detect motions of the first to fifth objects in a first sub-region (2, 1), a second sub-region (2, 2), a third sub-region (2, 3), a fourth sub-region (2, 4), and a fifth sub-region (3, 3). However, in the example illustrated in FIG. 19A, different from the example illustrated in FIG. 18A, the image capturing apparatus 100 may monitor a sub-region in which motion is detected at every moment without setting the sub-region in which the motion is detected as the object region and capture an image using a continuous shooting function every time motion is detected in a sub-region at a position close to a focus lens setting position 1900.

In FIG. 19A, a position at which images of objects are to be captured may be schematically a sub-region 1920. In order to capture the images of the objects in the sub-region 1920, it is necessary to monitor the motion of the object from the sub-region 1910 before the object 1420 enters the sub-region 1920. Accordingly, when the focus lens setting position 1900 is determined, the image capturing apparatus 100 may monitor the distance of the object and set sub-regions 1910 and 1920 in which the image of the object is captured. Of course, the screen is divided into 5×7 regions in FIG. 19A as an example, but may be divided into units of smaller regions to detect accurate motion of the object. In addition, the motion of the object starts to be detected and the region in which the image of the object is captured is displayed as the sub-regions 1910 and 1920 in FIG. 19A, but this is only an example. As long as the sub-regions 1910 and 1920 are regions for preparing to capture an image of the object at the focus lens setting position 1900, the regions may be determined in any form.

Referring to FIG. 19B, a state in which the fifth object enters the sub-region 1910 according to the passage of time is illustrated. Because the image capturing apparatus 100 monitors motion detection in the sub-region 1910 and the sub-region 1920, the image capturing apparatus 100 may measure the distance and Z-axis movement direction speed in the sub-region 1610 when the fifth object moves in the sub-region 1910. The image capturing apparatus 100 may calculate a time until the object reaches the focus lens setting position 1900 based on the movement speed of the object in the sub-region 1910 and determine the image capturing timing based on the calculated time.

After the image capturing timing is determined, the image capturing apparatus 100 may provide a shutter-release signal to the image capturing unit 110 taking into account the shutter release lag at the image capturing timing.

Referring to FIG. 19C, the image capturing apparatus 100 may accurately capture an image of the fifth object at a point in time at which the motion of the fifth object is detected in the sub-region 1920 as illustrated in FIG. 19C because the shutter-release signal is provided in the image capturing unit taking into account the shutter release lag in advance in the state of FIG. 19B before the fifth object arrives at the distance of the focus lens setting position 1900.

In addition, because the motion of the fourth object is detected in the sub-region 1910, the image capturing apparatus 100 may calculate a time until the fourth object arrives at the focus lens setting position 1900 based on a movement speed of the fourth object in the sub-region 1910 and determine the image capturing timing based on the calculated time. After the image capturing timing is determined, the image capturing apparatus 100 may provide the image capturing unit 110 with the shutter-release signal taking into account the shutter release lag at the image capturing timing.

Referring to FIG. 19D, the image capturing apparatus 100 may accurately capture an image of the fourth object at a point in time at which the motion of the fourth object is detected in the sub-region 1920 as illustrated in FIG. 19D because the shutter-release signal is provided in the image capturing unit taking into account the shutter release lag in advance in the state of FIG. 19C before the fourth object arrives at the focus lens setting position 1900.

According to the above-described operation, the image capturing apparatus 100 may continuously capture objects in the sub-region 1920 set at the same distance as the focus lens setting position 1900.

As described with reference to FIG. 17, the number of images to be captured by the image capturing apparatus 100 may be determined by the number of object regions because the user determines the number of regions of objects of images to be captured when regions of a plurality of objects are set by the user.

However, when a plurality of object regions are not selected by the user, but automatically set within the image capturing apparatus 100 as described with reference to FIGS. 18 and 19, it may be necessary to determine the number of images to be continuously captured.

According to an example embodiment, the image capturing apparatus 100 may stop image capturing when the user presses the release button in a mode in which images of a plurality of objects are automatically captured in the continuous shooting function. For example, when a signal of a pressed release button is received from the user while the images of the plurality of objects are automatically captured in the continuous shooting function, the automatic image capturing may be terminated by determining the received signal as an end signal of the automatic image capturing mode.

According to an example embodiment, the image capturing apparatus 100 may set a duration of an operation mode in which the images of the plurality of objects are automatically captured in the continuous shooting function.

FIG. 20A illustrates an example of a user interface to be output to set a duration of an operation mode in which the image capturing apparatus 100 automatically captures images of a plurality of objects using the continuous shooting function.

Referring to FIG. 20A, the display 130 of the image capturing apparatus 100 may output a user interface 2000 so that the duration of the operation mode in which the images of the plurality of objects are automatically captured in the continuous shooting function may be set.

The user may set the auto capture duration in units of seconds in the user interface 2000 illustrated in FIG. 20A, and the auto capture duration may be set by moving an indicator 2020 to the left/right on a bar 2010.

For example, when the user sets the auto capture duration to 4 sec as illustrated in FIG. 20A, the image capturing apparatus 100 may continuously capture an image of the next object for 4 sec from a point in time at which an image of the first object among a plurality of objects is automatically captured in a multi-shot auto capture mode.

Figure 20B:
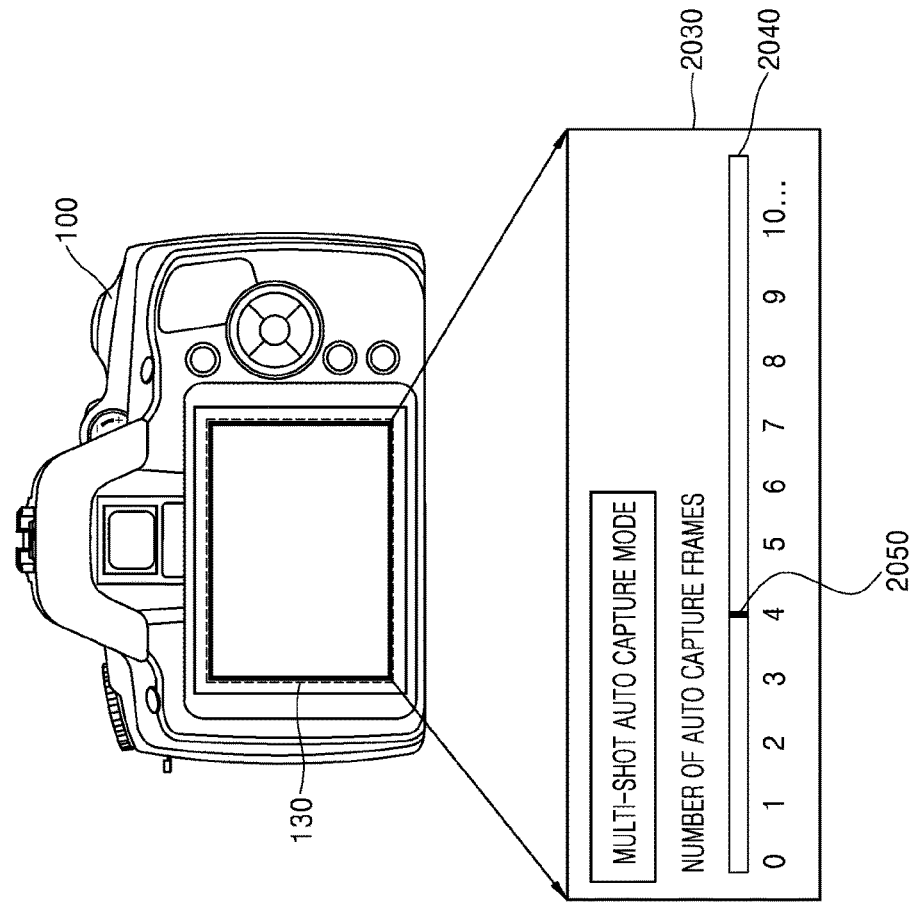

FIG. 20B illustrates an example of a user interface to be output to set a duration of an operation mode in which the image capturing apparatus 100 automatically captures images of a plurality of objects using a continuous shooting function according to an exemplary embodiment.

Referring to FIG. 20B, the display 130 of the image capturing apparatus 100 may output a user interface 2030 so that the duration of the operation mode in which the images of the plurality of objects are automatically captured in the continuous shooting function may be set using the number of frames.

The user may set the auto capture duration in units of frames in the user interface 2030 illustrated in FIG. 20B, and the number of image frames to be captured during the auto capture mode may be set by moving an indicator 2050 to the left/right on a bar 2040.

For example, when the user sets the number of image frames to be captured during the auto capture mode to four as illustrated in FIG. 20B, the image capturing apparatus 100 may generate four image frames by continuously capturing four images of the next object from a point in time at which an image of the first object among the plurality of objects is automatically captured in the multi-shot auto capture mode.

According to an example embodiment, the mode in which the image of the object that moves on the Z axis is automatically captured may be applied to various examples.

An operation in the Z-axis trap shot mode in a captured image of a running race at a sporting event will be described with reference to FIGS. 7A and 7B.

The user sets the image capturing apparatus 100 in the Z-axis trap shot mode.

The image capturing apparatus 100 sets a position 710 of the focus lens at a distance at which an image of the track is desired to be captured. When the image capturing apparatus 100 half presses the shutter or activates an auto shot operation through a touch in accordance with a red region at the same distance (for example, at the bottom) as that at which the object is shown to capture an image of the object which is not yet displayed on the screen, the focus lens is locked after a focus is first set at a corresponding position.

The image capturing apparatus 100 selects a child of an image desired to be captured among children positioned on a starting line as an object region 720.

When the child selected as the object region 720 starts to run, the object tracking module of the image capturing apparatus 100 updates coordinates of the object region 720 after detecting a position change (a change on the X and Y axes) on the screen of the object through an object tracking or face detection function or the like.

The object tracking module of the image capturing apparatus 100 may track only an object region in an image and secure a more precise phase-difference AF value by moving the focus lens while tracking the object.

When the object region 720 is close to the focus lens setting position 710, the Z-axis movement speed prediction module of the image capturing apparatus 100 predicts a time at which the object will be accurately in focus using a moving-object prediction function.

The image capturing apparatus 100 may detect the speed of the object through the moving-object prediction function, and when the speed of the object is high, calculate an appropriate exposure time by setting an optimum shutter speed to a value less than $\frac{1}{125}$ sec based on a speed of the object so that image blur due to movement of the object is minimized and a clear image is captured and adjusting the brightness of the image according to International Organization for Standardization (ISO) sensitivity or diaphragm setting without merely calculating brightness information when the controller (for example, an automatic exposure control module) calculates the appropriate exposure time. The image capturing time calculation module of the image capturing apparatus 100 sends a release signal to the image capturing unit for a shot when the optimum release timing is reached, so that an image of the object (region) 740 captured at a focus lens setting position 710 may be obtained as illustrated in FIG. 7B.

Figure 21:
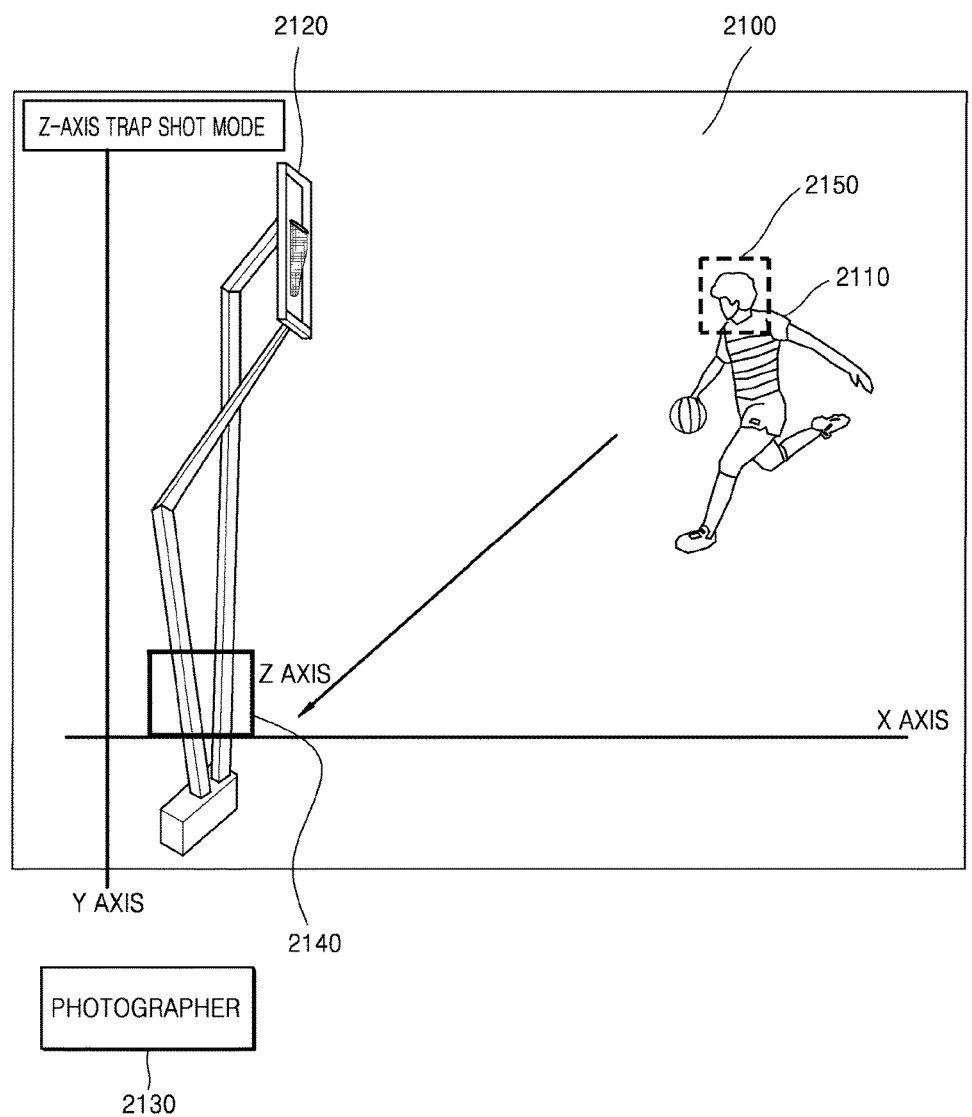
FIG. 21 is a diagram illustrating an example operation in a Z-axis trap shot mode when an image of a basketball game is captured.

FIG. 21 is a diagram illustrating an example operation in a Z-axis trap shot mode when an image of a basketball game is captured.

Referring to FIG. 21, a photographer 2130 may desire to capture an image when a basketball player 2110 who comes from a far position is close to a basket 2120 in a state in which the photographer 2130 is positioned near the basket 2120 to capture an image 2100 of the basketball player 2110 who comes running toward the basket 2120 while dribbling the ball.

At this time, a distance between the photographer and the position of the basketball player who comes running from a far position to the basket 2120 in a running direction of the basketball player becomes a Z axis. The X axis is a horizontal axis in the image and the Y axis is a vertical axis, that is, a height from the ground, in an image. The photographer 2130 may set a position 2140 of the focus lens at a position at which the image of the basketball player who is an object is desired to be captured and set a region 2150 of the object.

The image capturing apparatus 100 may predict a time at which the object region 2150 will be in focus at the same distance as that of the focus lens setting position 2140 when the object region 2150 is close to the focus lens setting position 2140 while the image capturing apparatus 100 tracks the object region 2150 and measures the movement speed of the object region 2150, and determine the timing at which the shutter-release signal is provided taking into account the shutter release lag.

This operation will be described in greater detail below.

In the image capturing apparatus 100, the user sets a Z-axis trap shot mode.

The user sets the focus lens position at the basket according to an image capturing composition. For example, when the user sets an AF region at the basket and half presses the shutter or activates the auto shot operation through a touch, the focus lens is locked after the focus is first set at an AF position. In addition, the user may set the object region 2150. The distance determination module of the image capturing apparatus 100 starts to detect distance information of the object region 2150 and the image capturing time calculation module starts to calculate the shutter release timing.

When a distance (speed) change starts to be detected in the object region 2150, the Z-axis movement speed prediction module transfers movement speed information to the image capturing time calculation unit after calculating the movement speed.

The Z-axis movement speed prediction module may detect the speed of the object through the moving-object prediction function and calculate an appropriate exposure time.

The image capturing time calculation module may send the release signal to the image capturing unit when the optimum shutter release timing is reached for a shot.

Figure 22:
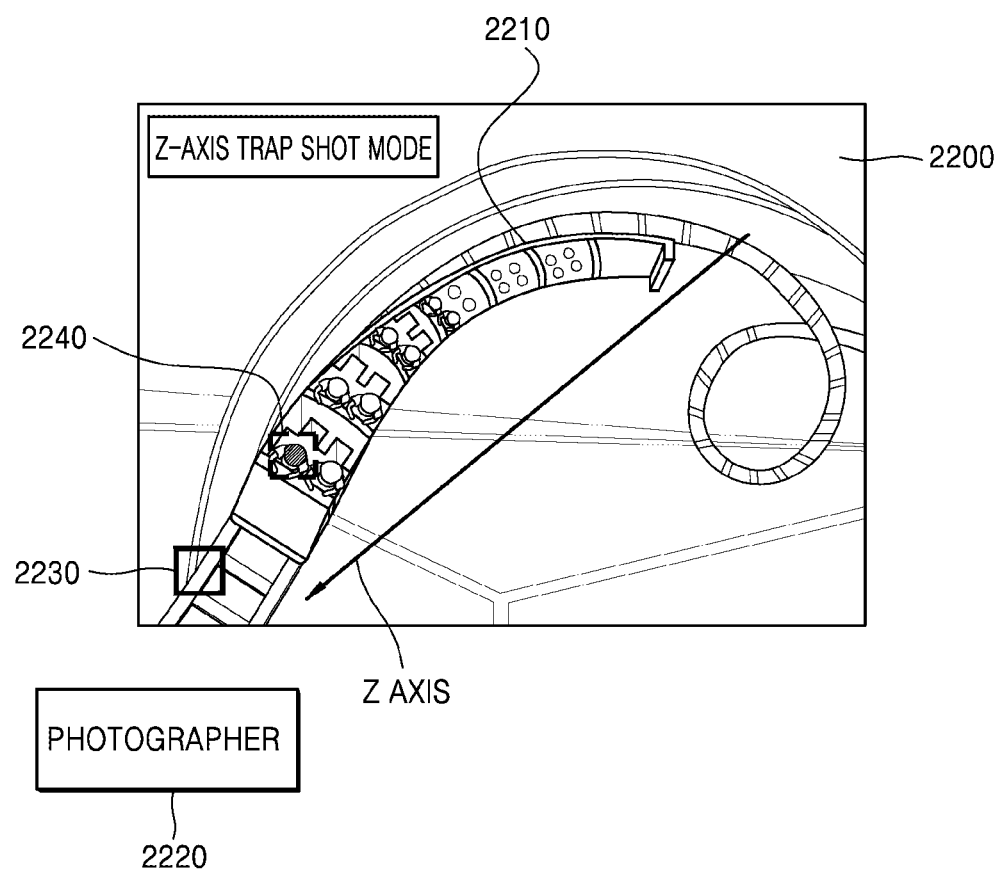
FIG. 22 is a diagram illustrating an example operation in the Z-axis trap shot mode when an image of an object riding a roller coaster in an amusement park is captured.

FIG. 22 is a diagram illustrating an example operation in the Z-axis trap shot mode when an image of an object riding a roller coaster in an amusement park is captured. Referring to FIG. 22, the photographer 2220 may desire to capture an image when a roller coaster 2210 which comes from afar is close to the photographer 2220 when the photographer 2220 is positioned to face the roller coaster 2210 to capture the image of another person riding the roller coaster 2210 in an image 2200.

A distance between the photographer and the position of the roller coaster which comes from afar to the photographer 2220 in a running direction of the roller coaster becomes a Z axis. The photographer 2220 may set a position 2230 of the focus lens at a position at which the image of an object is desired to be captured and set a region 2240 of the object.

The image capturing apparatus 100 may predict a time at which the object region 2240 will be in focus at the same distance as that of the focus lens setting position 2230 when the object region 2240 is close to the focus lens setting position 2230 while the image capturing apparatus 100 tracks the object region 2240 and measures the movement speed of the object region 2240, and determine the timing at which the shutter-release signal is provided taking into account the shutter release lag.

FIGS. 23A and 23B are diagrams illustrating an example operation in the Z-axis trap shot mode when an image of a car race is captured.

In the image capturing apparatus 100, the user sets a Z-axis trap shot mode.

Referring to FIG. 23A, the image capturing apparatus 100 sets a focus lens setting position 2310 on another object at a distance at which an image of a car which is an object is desired to be captured in an image 2300. For example, when the image capturing apparatus 100 half presses the shutter or activates an auto shot operation through a touch in accordance with a red region at the same distance (for example, at the bottom) as that at which the object is shown, the focus lens is locked after focus is first set at a corresponding position.

In addition, the user may set an object region 2320 at a position at which the image of the object is desired to be captured in the image 2300 because there is no object in the image 2300.

The distance determination module of the image capturing apparatus 100 starts to detect a distance (phase difference or depth) of the object region 2320 and the image capturing time calculation module starts to calculate the shutter release timing.

The image capturing apparatus 100 predicts a time at which the object will be accurately in focus using the moving-object prediction function of phase difference AF in the Z-axis movement speed prediction module when speed (phase difference) information changes while the object enters the object region 2320.

The image capturing apparatus 100 may detect the speed of the object through the moving-object prediction function and calculate an appropriate exposure time. The image capturing time calculation module of the image capturing apparatus 100 sends a release signal to the image capturing unit for a shot when the optimum release timing is reached, so that an image of an object region 2330 captured at a focus lens setting position 2310 may be obtained as illustrated in FIG. 23B.

A method of operating an image capturing apparatus according to example embodiments of the present disclosure may be recorded in a non-transitory computer-readable medium, being implemented in the form of a program command executable through various computer means. The non-transitory computer-readable medium may include program commands, file data, data structure, and so on individually or in combinations thereof. The program commands recorded in the medium may be those specially designed and configured for the present disclosure or those well known to those skilled in the computer software field. Examples of a non-transitory computer-readable medium include magnetic media such as a hard disk, a floppy disk, and a magnetic tape; optical media such as a CD-ROM and a DVD; magneto-optical media such as a floptical disk; and a hardware device specially configured to store and execute program commands such as a ROM, a RAM, and a flash memory. Examples of a program command include high level language codes executable in a computer by using an interpreter as well as assembly codes generated by a compiler.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. An image capturing apparatus comprising:
    an image sensor; and
    a controller connected to the image sensor,
    wherein the controller is configured to:
        in response to user input for setting a distance at which to capture an image including an object, set a focus position of a focus lens at the set distance,
        determine a movement speed of the object,
        determine an image capturing time by predicting a time until the object reaches the set focus position of the focus lens based on the determined movement speed, and
        control the image sensor to capture the image of the object at the determined image capturing time and with the focus position of the focus lens at the set focus position.

2. The image capturing apparatus according to claim 1, wherein the controller is configured to determine the image capturing time taking into account a shutter release lag.

3. The image capturing apparatus according to claim 1, wherein the controller is configured to set the focus position of the focus lens based on another object located at the set distance.

4. The image capturing apparatus according to claim 1, wherein the controller is configured to set the focus position of the focus lens based on receiving a touch input for selecting a region in which another object at the set distance is located.

5. The image capturing apparatus according to claim 1, wherein the controller is configured to set the focus position of the focus lens based on another object located at the set distance being located in an autofocus (AF) region and receiving a half shutter input.

6. The image capturing apparatus according to claim 1, wherein the controller is configured to set one or more object regions based on selection of one or more object regions displayed on a screen.

7. The image capturing apparatus according to claim 1, wherein the controller is configured to set an object region based on selection of a region shown on a screen corresponding to the set distance.

8. The image capturing apparatus according to claim 1, wherein the controller is configured to divide a screen into a plurality of sub-regions and to set one or more regions for which movement speeds are detected among the plurality of sub-regions as one or more object regions.

9. The image capturing apparatus according to claim 1, wherein the controller is configured to divide a screen into a plurality of sub-regions, to determine distances and movement speeds associated with the sub-regions, and to perform automatic image capturing when a region predicted to be in focus at the set focus position of the focus lens is detected.

10. The image capturing apparatus according to claim 1, wherein the controller is configured to provide a user interface, the user interface being configured to receive an input for setting a duration in which images of a plurality of objects are captured in a mode in which the images of the plurality of objects are captured.

11. A method of capturing an image, comprising:
    in response to user input for setting a distance at which to capture an image including an object, setting a focus position of a focus lens at the set distance;
    determining a movement speed of the object;
    determining an image capturing time by predicting a time until the object reaches the set focus position of the focus lens based on the measured movement speed; and
    capturing the image of the object at the determined image capturing time and with the focus position of the focus lens at the set focus position.

12. The method according to claim 11, wherein the determining includes determining the image capturing time taking into account a shutter release lag.

13. The method according to claim 11, wherein the setting includes setting the focus position of the focus lens based on another object located at the set distance.

14. The method according to claim 11, wherein the setting includes setting the focus position of the focus lens based on receiving a touch input for selecting a region in which another object at the set distance is located.

15. The method according to claim 11, wherein the setting includes setting the focus position of the focus lens based on another object located at the set distance being located in an autofocus (AF) region and receiving a half shutter input.

16. The method according to claim 11, further comprising:
    setting one or more object regions based on selection of one or more object regions displayed on a screen.

17. The method according to claim 11, further comprising:
    setting an object region based on selection of a region shown on a screen corresponding to the set distance.

18. The method according to claim 11, further comprising:
    dividing a screen into a plurality of sub-regions; and
    setting one or more regions for which movement speeds are detected among the plurality of sub-regions as one or more object regions.

19. The method according to claim 11, further comprising:
    dividing a screen into a plurality of sub-regions;
    determining distances and movement speeds associated with the sub-regions; and
    performing automatic image capturing when a region predicted to be in focus at the set focus position of the focus lens is detected.

20. The method according to claim 11, further comprising:
    providing a user interface, the user interface being configured to receive an input for setting a duration in which images of a plurality of objects are captured in a mode in which the images of the plurality of objects are captured.

* * * * *